United States Patent
Ekiner et al.

(10) Patent No.: US 8,268,041 B2
(45) Date of Patent: Sep. 18, 2012

(54) HOLLOW ORGANIC/INORGANIC COMPOSITE FIBERS, SINTERED FIBERS, METHODS OF MAKING SUCH FIBERS, GAS SEPARATION MODULES INCORPORATING SUCH FIBERS, AND METHODS OF USING SUCH MODULES

(75) Inventors: Okan Max Ekiner, Wilmington, DE (US); Timothy L. Murray, Newark, DE (US); Nicolas Richet, Fontenay-le-Fleury (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 380 days.

(21) Appl. No.: 12/490,060

(22) Filed: Jun. 23, 2009

(65) Prior Publication Data
US 2010/0018394 A1 Jan. 28, 2010

Related U.S. Application Data

(63) Continuation-in-part of application No. 12/165,647, filed on Jun. 30, 2008, now abandoned.

(51) Int. Cl.
*B01D 53/22* (2006.01)
(52) U.S. Cl. .......... 95/45; 95/54; 95/55; 96/10; 423/700
(58) Field of Classification Search ............... 95/45, 54, 95/55; 96/10; 423/700
See application file for complete search history.

(56) References Cited

U.S. PATENT DOCUMENTS

| | | | |
|---|---|---|---|
| 4,127,625 A * | 11/1978 | Arisaka et al. ................... 264/28 |
| 4,175,153 A * | 11/1979 | Dobo et al. .................... 428/398 |
| 4,222,977 A * | 9/1980 | Dobo ............................ 264/634 |
| 4,268,278 A * | 5/1981 | Dobo et al. ........................ 419/2 |
| 4,329,157 A * | 5/1982 | Dobo et al. ........................ 95/56 |
| 4,348,458 A | 9/1982 | Otstot |
| 4,806,189 A * | 2/1989 | Kraus et al. .................... 156/155 |
| 4,822,382 A * | 4/1989 | Nelson .............................. 95/54 |
| 5,015,270 A * | 5/1991 | Ekiner et al. ...................... 95/54 |
| 5,102,600 A * | 4/1992 | Ekiner et al. ............. 264/177.15 |
| 5,707,584 A * | 1/1998 | Terpstra et al. ............... 264/628 |
| 5,798,060 A * | 8/1998 | Brevett ...................... 252/520.1 |
| 5,799,960 A * | 9/1998 | Davis, Sr. .................. 280/47.31 |
| 6,261,510 B1 * | 7/2001 | Terpstra et al. ............... 264/628 |

(Continued)

FOREIGN PATENT DOCUMENTS
EP 0 686 390 12/1995
(Continued)

OTHER PUBLICATIONS

Aldrich "Reference: Polymer Properties" <http://www.sigmaaldrich.com/etc/medialib/docs/Aldrich/General_Information/thermal_transitions_of_homopolymers.Par.0001.File.tmp/termal_transitions_of_homopolymers.pdf> 2011, pp. 52 and 53.*

(Continued)

*Primary Examiner* — Jason M Greene
*Assistant Examiner* — Anthony Shumate
(74) *Attorney, Agent, or Firm* — Christopher J. Cronin

(57) ABSTRACT

A suspension of inorganic particles, a copolymer comprising soft segments and hard segments, and a solvent may be extruded through a spinnerette to produce inorganic/organic composite hollow precursor fibers. The precursor fibers may be sintered. The fibers may be utilized in a gas separation module for separation of a gas mixture or production of syngas. The fibers may be installed in the gas separation module after sintering or they may be sintered after installation.

40 Claims, 17 Drawing Sheets

U.S. PATENT DOCUMENTS

| | | | |
|---|---|---|---|
| 6,492,290 B1* | 12/2002 | Dyer et al. | 502/4 |
| 6,602,324 B2 | 8/2003 | Stein et al. | |
| 6,641,643 B2 | 11/2003 | Jensvold et al. | |
| 6,843,829 B2 | 1/2005 | Simmons | |
| 6,860,920 B2 | 3/2005 | Simmons | |
| 6,875,528 B1 | 4/2005 | Nagai et al. | |
| 7,306,647 B2* | 12/2007 | Miller et al. | 95/45 |
| 2001/0033060 A1 | 10/2001 | White et al. | |
| 2003/0225197 A1* | 12/2003 | Rajagopalan et al. | 524/308 |
| 2005/0194571 A1 | 9/2005 | Elangovan et al. | |
| 2005/0252372 A1 | 11/2005 | Gopalan | |
| 2006/0154057 A1* | 7/2006 | Nonninger | 428/364 |
| 2007/0151450 A1* | 7/2007 | Giacobbe | 95/128 |
| 2009/0131242 A1* | 5/2009 | Liu et al. | 502/4 |
| 2009/0161100 A1* | 6/2009 | Minot et al. | 356/244 |
| 2010/0242723 A1* | 9/2010 | Liu et al. | 95/46 |
| 2010/0326126 A1* | 12/2010 | Seiler et al. | 62/497 |

FOREIGN PATENT DOCUMENTS

| | | |
|---|---|---|
| EP | 0 688 892 | 12/1995 |
| EP | 1 452 633 | 9/2004 |
| EP | 1 547 672 | 6/2005 |
| WO | WO 03 051495 | 6/2003 |
| WO | WO 2007 007051 | 1/2007 |

OTHER PUBLICATIONS de Jong, J., et al., "Towards single step production of multi-layer inorganic hollow fibers," Journal of Membrane Science, 239 (2004) pp. 265-269.

Li, K., et al., "Single-step fabrication of ceramic hollow fibers for oxygen permeation," Journal of Membrane Science, 272 (2006) pp. 1-5.

Liu, Y., et al., "Preparation of yttria-stabilised zirconia (YSZ) hollow fibre membranes," Desalination, 199 (2006), pp. 360-362.

Lu, G.Q. (Max), "Evolution of the pore structure of a ceramic powder compact during sintering," Journal of Materials Processing Technology, 59 (1996), pp. 297-302.

Tan, Xiaoyao, et al., "Preparation and characterization of inorganic hollow fiber membranes," Journal of Membrane Science, 188 (2001), pp. 87-95.

Tasselli, F., et al., "Morphology and transport property control of modified poly(ether ether ketone) (PEEKWC) hollow fiber membranes prepared from PEEKWC/PVP blends: influence of the relative humidity in the air gap," Journal of Membrane Science, 255 (2005), pp. 13-22.

Tsai, H.A., et al., "Morphology control of polysulfone hollow fiber membranes via water vapor induced phase separation," Journal of Membrane Science, 278 (2006), pp. 390-400.

Wang, Dongliang, et al., "Preparation and characterization of polyetherimide asymmetric hollow fiber membranes for gas separation," Journal of Membrane Science, 138 (1998), pp. 193-201.

Wei, Chiao Chien, et al., "Ceramic asymmetric hollow fibre membranes—One step fabrication process," Journal of Membrane Science, (2008), doi:10.1016/j.memsci.2008.04.003, 7 pgs.

Liu, S. And Gavalas, G.R., "Oxygen Selective Ceramic Hollow Fiber Membranes," Journal of Membrane Science, 246 (2005) 103-108.

Schiestel, T., et al., "Hollow Fibre Perovskite Membranes for Oxygen Separation," Journal of Membrane Science, 258 (2005) 1-4.

Wang, H., et al., "Experimental and Modeling Studies of BSCF Tubular Membranes for Air Separation," Journal of Membrane Science (JMS), 243, (2005) 405-415.

Tan, X., et al., "Preparation of LSCF Ceramic Hollow Fiber Membranes for Oxygen Production by a Phase Inversion/Sintering Technique," Ind.Eng.Chem.Res., (2005), 44, pp. 61-66.

EP 2 141 268 Search Report dated Sep. 17, 2009.

* cited by examiner

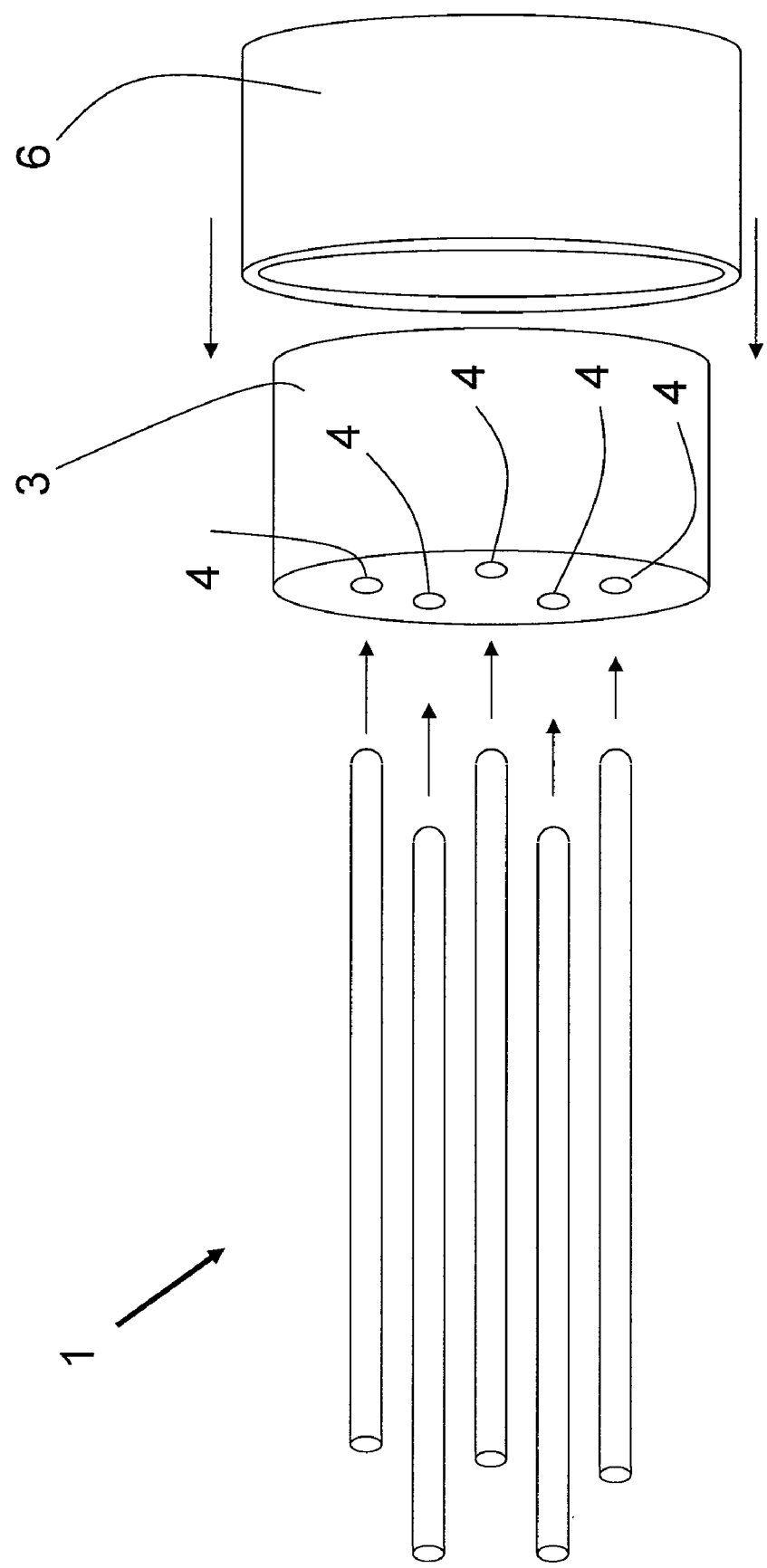

HOLLOW ORGANIC/INORGANIC COMPOSITE FIBERS, SINTERED FIBERS, METHODS OF MAKING SUCH FIBERS, GAS SEPARATION MODULES INCORPORATING SUCH FIBERS, AND METHODS OF USING SUCH MODULES

RELATED APPLICATIONS

This application is a Continuation In Part of U.S. application Ser. No. 12/165,647 filed Jun. 30, 2008, the contents of which are herein incorporated by reference in their entirety.

FIELD OF THE INVENTION

This invention relates to polymeric/inorganic hollow fibers, sintered fibers, method of making the fibers, gas separation modules incorporating the hollow or sintered fibers, and methods of using the gas separation modules.

BACKGROUND

The use of hollow-fiber membranes for separation of mixtures of liquids and gases is well-developed and commercially very important art. Such membranes are traditionally composed of a homogeneous, usually polymeric composition through which the components to be separated from the mixture are able to travel at different rates under a given set of driving force conditions, e.g. trans-membrane pressure and concentration gradients. Examples are the desalination of water by reverse osmosis, separation of water/ethanol mixtures by pervaporation, separation of hydrogen from refinery and petrochemical process streams, enrichment of oxygen or nitrogen from air, and removal of carbon dioxide from natural gas streams. In each separation, the membranes must withstand the conditions of the application, and must provide adequate flux and selectivity to be economically attractive. The use of hollow fibers is recognized to have advantages over flat film or planar membranes due to the large membrane surface area for separation within a specific volume of apparatus. The success of polymeric hollow fiber membranes has in part been due to the ability to produce fibers of extremely small diameter—in some cases, the diameter of a human hair (~80 µm). The ability to utilize small-diameter fibers allows extremely high module surface areas, which allows processing high volumes of fluid for each membrane module.

In certain applications where high chemical resistance and operation at high temperature and pressure are desired, polymeric membranes have not been suitable because of degradation of membrane performance during operation. Inorganic or ceramic membranes have been successfully made in flat or planar shapes and large cylindrical tubes (>1 cm diameter), but have had limited commercial success because of their relatively low surface area compared to small-diameter hollow fibers. Production of small-diameter ceramic hollow fibers has been problematical with respect to strength of the precursor fiber (sometimes referred to as "green" fiber) and the final fiber after sintering.

Such hollow fibers are typically made from a suspension of inorganic particles in a liquid medium with a suitable binder to form a paste, which is subsequently extruded through an annular die to form a precursor hollow fiber. After removal of the liquid dispersion medium, the precursor fiber is sintered at elevated temperature to consolidate the individual particulate structure into a micro-porous structure.

For the production of small-diameter inorganic fibers, it has been found to be beneficial to incorporate a polymeric binder in the paste to strengthen the nascent fiber. The polymer is typically soluble in the liquid medium of the paste. After the paste is extruded to form a nascent hollow fiber, the polymer solution in the interstices between the inorganic particles is coagulated to solidify the polymer by passing the nascent fiber into a liquid bath containing a coagulating fluid; alternatively, the liquid can be removed by evaporation to solidify the polymer. The resulting polymeric/inorganic precursor fiber has considerably greater strength and ductility than in the absence of a polymeric binder.

U.S. Pat. Nos. 4,175,153, 4,222,977, 4,268,278, and 4,329, 157 disclose a process to make a polymeric/inorganic precursor for inorganic hollow fibers via extrusion of a mixture of an inorganic material uniformly dispersed in a polymer solution. The polymer solution comprises a fiber-forming organic polymer dissolved in a suitable solvent.

U.S. Pat. No. 5,707,584 discloses a process to make a polymeric/inorganic precursor for ceramic hollow fibers by melt extruding a paste consisting of a thermoplastic polymer binder system with a ceramic powder through a spinneret. The preferred polymer composition is polyethylene/vinyl acetate copolymer mixed with various plasticizers.

U.S. Pat. No. 6,261,510 discloses a process to make a polymeric/inorganic precursor for ceramic hollow fibers by extruding a paste consisting of a water-soluble polymer, typically methylcellulose in water solvent, through a spinneret at room temperature.

U.S. Pat. No. 6,492,290 discloses polymeric/inorganic precursors for ceramic ion-conducting planar membranes by extruding a paste consisting of a mixture of inorganic metallic oxides dispersed in solution of polyvinylbutyral in a suitable solvent.

U.S. Patent Application 2006/0154057 A1 discloses a process to make a polymeric/inorganic precursor for inorganic hollow fibers via extrusion of a mixture of an inorganic material dispersed in any suitable thermoplastic polymer, or an acrylate-based polymer system that can be cross-linked after extrusion.

World Patent Application WO2007/007051 discloses a process to make a polymeric/inorganic precursor for inorganic hollow fibers via extrusion of a mixture of an inorganic material dispersed in a polymer solution, typically comprised of polyethersulfone and solvent.

Liu and Gavalas (J. Membrane Science 246 (2005) 103-108, Elsevier) describe making a polymeric/ceramic hollow fiber precursor by spinning a dispersion of perovskite in a polysulfone solution into an aqueous coagulation bath, which imparts some degree of asymmetry in the fiber wall. The precursor fiber was sintered at 1190° C. to form a ceramic hollow fiber.

EP1547672 discloses a ceramic hollow fibre membrane module.

U.S. Pat. No. 4,348,458 discloses methods of manufacturing coiled ceramic hollow fibres.

WO2003051495 discloses methods of manufacturing ceramic hollow fiber membrane modules.

An object of this invention is to produce small-diameter precursor polymeric/inorganic hollow-fibers that exhibit the desired processability and strength during manufacture with the desired microstructure morphology that, after sintering, provides a suitably effective separation membrane.

SUMMARY OF THE INVENTION

There is provided a composite hollow fiber comprised of inorganic particles bound together with a copolymer comprising soft segments and hard segments.

There is also provided a sintered hollow fiber made by sintering the above-disclosed composite hollow fiber.

There is also provided a method of making a hollow inorganic/polymeric composite fiber including the following steps. A suspension of particulate inorganic material, a copolymer binder, and solvent for the copolymer binder) is prepared, the copolymer comprising soft and hard segments. A spinneret is provided that is adapted and configured to continuously extrude one or more nascent hollow fibers, wherein the spinneret has an inner annular channel disposed concentrically within an outer annular channel. A bore fluid is fed through the inner annular channel to form a cylindrical fluid stream positioned concentrically within the fibers. The suspension is fed through the outer annular channel so that it surrounds the cylindrical fluid stream to form a nascent hollow fiber. The nascent hollow fiber is passed from the spinneret through an air gap. The nascent hollow fiber is immersed in a liquid coagulant to facilitate phase inversion. The fiber is withdrawn from the coagulant and wound onto a take-up roll. The wound fiber is washed to remove residual solvent. The washed fiber is dried to remove volatile material.

There is also provided a gas separation membrane module that includes: first and second opposed tubesheets; at least one of the hollow composite fibers (especially where the inorganic particles are made of a perovskite); a housing enclosing the tubesheets and fiber, the housing having an outlet port; a first end cap engaging with the housing to define a space defined by an outer planar surface of the first tubesheet, an inner surface of the housing, and an inner surface of the first end cap; and a second end cap engaging with the housing to define a space defined by an outer planar surface of the second tubesheet, an inner surface of the housing, and an inner surface of the second end cap. The second end cap has an outlet port. The at least one sintered fiber has a first end extending through a hole extending through the first tubesheet and a second end extending through a hole formed in the second tubesheet. The first end cap has an inlet port. The fibers may or may not already be sintered. In the case of non-sintered fibers, they may be sintered after the module has been assembled.

There is also provided a gas production method, including the following steps. The above gas separation membrane module is provided. A first gas is introduced to one side of said at least one fiber. A second gas is withdrawn from an opposite side of said at least one fiber. The second gas comprises hydrogen or oxygen.

Any of the hollow inorganic/polymeric composite fiber, the method of making the hollow inorganic/polymeric composite fiber, the sintered hollow fiber made by sintering the hollow inorganic/polymeric composite fiber, the gas separation module, and the method of using the gas separation module may include one or more of the following aspects:

a weight ratio of inorganic particles to copolymer in the hollow composite fiber is in a range of from about 5.0:1.0 to about 15.0:1.0.

a weight ratio of inorganic particles to copolymer in the hollow composite fiber is in a range of from about 7.0:1.0 to about 12.0:1.0.

an outside diameter of the hollow composite fiber is in a range from about 100 to 2000 μm and a ratio of the outside-diameter to the inside-diameter is in a range of from about 1.20:1.0 to about 3.0:1.0.

a percent elongation at break of the hollow fiber is in the range of from about 2.0% to about 5.0%.

the copolymer is a block copolymer selected from the group consisting of poly(ether)urethane-block-polyurethane, poly(ether)urethane-block-polyurea, poly(ester)urethane-block-polyurethane, and poly(ester)urethane-block-polyurea.

the copolymer is a block copolymer selected from the group consisting of poly(ether)urethane-block-polyurethane, poly(ether)urethane-block-polyurea, poly(ester)urethane-block-polyurethane, and poly(ester)urethane-block-polyurea, wherein the block copolymer essentially consists of a first block comprising repeating units represented by formula Ia and a second block comprising repeating units represented by formula Ib:

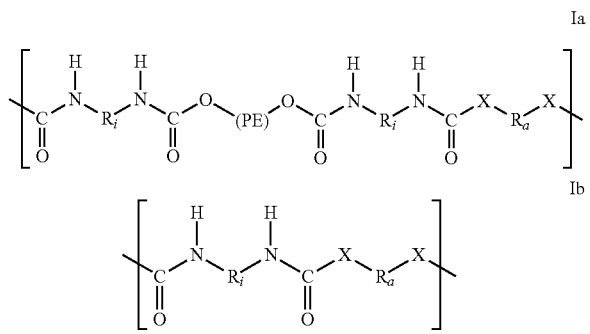

wherein, each $R_i$ is independently an aliphatic or aromatic radical;

each PE is independently a polyether or polyester;

each $R_a$ is independently a linear or branched aliphatic radical; and

X is O or NH.

each $R_i$ is independently an aliphatic or aromatic radical comprising 2-18 carbon atoms.

PE has a weight average molecular weight, $M_w$, ranging from about 600 to 8000.

each $R_a$ is independently a linear or branched aliphatic radical comprising 2-18 carbon atoms, and X is O.

each $R_a$ is independently a linear or branched aliphatic radical comprising 2-18 carbon atoms and X is NH.

the block copolymer has a weight average molecular weight in the range of from about 23,000 to about 400,000.

each $R_i$ is independently selected from the group consisting of a straight chain —$(CH_2)_6$—, a moiety of formula S, a moiety of formula T, a moiety of formula U, and a moiety of formula V:

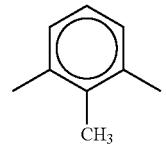

(S)

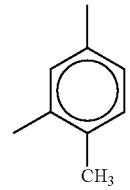

(T)

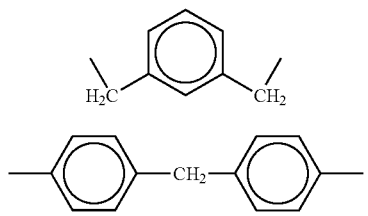

(U)

(V)

each $R_i$ is identical, each PE is identical, and each $R_a$ is identical.

each PE is independently a polyether derived from a polyether glycol selected from the group consisting of hydroxyl terminated polyethylene glycol, hydroxyl terminated 1,2-polypropylene glycol, hydroxyl terminated 1,3-polypropylene glycol, and hydroxyl terminated 1,4-polybutylene glycol.

each PE is independently a polyester derived from the reaction of a linear or branched aliphatic diol comprising 2-18 carbon atoms and a linear or branched aliphatic diacid comprising 2-18 carbon atoms.

each $R_a$ is independently derived from at least one linear or branched aliphatic diol comprising 2-18 carbon atoms.

each diol is independently selected from the group consisting of ethylene glycol, 1,3-propanediol, 1,2-propanediol, 1,4-butanediol, and 1,6-hexanediol.

each $R_a$ is independently derived from a linear or branched aliphatic diamine comprising 2-18 carbon atoms.

each $R_a$ is independently derived from a diamine is selected from the group consisting of 1,2-diaminoethane, 1,4-diaminobutane, 1,5-diaminopentane, 1,5-diaminohexane, and 1,6-diaminohexane.

the soft segments comprise about 50-95 weight % of the copolymer.

the soft segments comprise about 60-90 weight % of the copolymer.

the inorganic particles are made of a material selected from the group consisting of an elemental metal, a metallic oxide, a zeolite, a perovskite, and mixtures thereof.

a median size of the inorganic particles in the dispersion or hollow composite fiber is less than about 1 μm.

the inorganic particles are made of a material selected from the group consisting of elemental Al, Zn, Cr, Pt, Fe, and mixtures thereof.

the inorganic particles are comprised of $BaCe_{1-x}M_xO_{3-d}$, where M is a metal dopant and x is greater than 0 but less than 1.

the inorganic particles are comprised of Ba-doped $CeO_2$ and Ni metal.

the inorganic particles are comprised of $La_{0.9}Sr_{0.1}Ga_{0.8}Mg_{0.2}O$ and Pd metal.

the inorganic particles are comprised of a multicomponent metal oxide of the general formula $(Ln_{1-x}A_x)_w(B_{1-y}B'_y)O_{3-d}$, wherein:
Ln represents one or more elements selected from the group consisting of La, the D block lanthanides, and Y;
A represents one or more elements selected from the group consisting of Mg, Ca, Sr, and Ba;
B and B' each represent one or more elements selected from the group consisting of Sc, Ti, V, Cr, Mn, Fe, Co, Ni, Zr, and Ga;
$0 \leq x \leq 1$, $0 \leq y \leq 1$, and $0.95 \leq w \leq 1.05$; and
d is a number that renders the compound charge neutral.

the inorganic particles are comprised of a perovskite of the formula $La_{0.8}Sr_{0.2}Fe_{0.7}Co_{0.3}O_{3-d}$ and d is a number that renders the compound charge neutral.

the inorganic particles are comprised of a perovskite of the formula $Ba_{0.5}Sr_{0.5}Fe_{0.2}Co_{0.8}O_{3-d}$ and d is a number that renders the compound charge neutral.

the inorganic particles are comprised of strontium doped lanthanum iron cobalt oxide of the composition $La_{(1-x)}Sr_xCo_{(1-y)}Fe_yO_{3-d}$, wherein $0<x<1$ and $0<y<1$ and d is a number such that the compound is electrically neutral.

the inorganic particles are comprised of strontium doped lanthanum iron cobalt oxide of the composition $La_{(1-x)}Sr_xCo_{(1-y)}Fe_yO_{3-d}$, wherein $0<x<0.4$ and $0<y<1$ and d is a number such that the compound is electrically neutral.

the inorganic particles are comprised of $La_{(1-x)}Ca_xCo_{(1-y)}Fe_yO_{3-d}$ wherein $0<x<1$ and $0<y<1$ and d is a number such that the compound is electrically neutral.

the inorganic particles are comprised of $La_{(1-x)}Sr_xCo_{y1}Fe_{y2}Ni_{y3}Cr_{y4}O_{3-d}$ wherein $x<1$ and $y1+y2+y3+y4=1$ and d is a number such that the compound is electrically neutral.

the inorganic particles are comprised of yttria stabilized zirconia doped with an oxide selected from the group consisting of $MnO_2$, $TiO_2$, FeO, and $Cr_2O_3$.

the inorganic particles are comprised of $CeO_2$ doped with an oxide selected from the group consisting of $MnO_2$, $TiO_2$, FeO, and $Cr_2O_3$.

the inorganic particles are comprised of a mixture of yttria stabilized zirconia and a metal selected from the group consisting of Pd, Pt, Ni, Ag, and Au.

the inorganic particles are comprised of a mixture of $RE_2O_3$ doped $CeO_2$ ionic conductor and a metal, wherein RE is selected from the group consisting of Y, Yb, Sc, and Gd and the metal is selected from the group consisting of Pd, Pt, Ni, Ag, and Au.

the inorganic particles are comprised of a mixture of $La_{1-x}Sr_xMg_yGa_{1-y}O_{3-d}$ and a metal, wherein x and y are greater than 0 and less than 1, the metal is selected from the group consisting of Ni and Pd and d is a number such that the compound is electrically neutral.

the inorganic particles are comprised of a perovskite of the formula $La_{0.8}Sr_{0.2}Fe_{0.7}Ga_{0.3}O_{3-\delta}$ and δ is a number that renders the perovskite charge neutral.

the inorganic particles are comprised of a perovskite of the formula $ACe_{0.95}L_{0.05}O_{3-d}$, where A is Ba or Ce, L is Y or Yb, and d is such that the perovskite is electrically neutral.

the inorganic particles are comprised of a perovskite of the formula $(Ln_{1-x}A_x)_w(B_{1-y}B'_y)O_{3-d}$, wherein:
Ln represents one or more elements selected from the group consisting of La, the D block lanthanides, and Y;
A represents one or more elements selected from the group consisting of Mg, Ca, Sr, and Ba;
B and B' each represent one or more elements selected from the group consisting of Sc, Ti, V, Cr, Mn, Fe, Co, Ni, Zr, and Ga;
$0 \leq x \leq 1$, $0 \leq y \leq 1$, and $0.95 \leq w \leq 1.05$; and
d is a number that renders the perovskite charge neutral.

the inorganic particles are comprised of a perovskite of the formula $La_{0.8}Sr_{0.2}Fe_{0.7}Ga_{0.3}O_{3-d}$ and d is a number that renders the perovskite charge neutral.

the inorganic particles are comprised of a strontium doped lanthanum iron cobalt oxide perovskite of the composition $La_{(1-x)}Sr_xCo_{(1-y)}Fe_yO_{3-d}$, wherein $0<x<1$ and $0<y<1$ and d is a number such that the perovskite is electrically neutral.

the inorganic particles are comprised of a perovskite of the formula $La_{0.8}Sr_{0.2}Fe_{0.7}Co_{0.3}O_{3-d}$, wherein d is a number such that the perovskite is electrically neutral.

the inorganic particles are comprised of a perovskite of the formula $Ba_{0.5}Sr_{0.5}Fe_{0.2}Co_{0.8}O_{3-\delta}$ and $\delta$ is a number such that the perovskite is electrically neutral.

the inorganic particles are comprised of a perovskite of the formula $BaCe_{1-x}M_xO_{3-d}$, where M is a metal dopant, x is greater than 0 but less than 1, and d is a number such that the perovskite is electrically neutral.

the inorganic particles are comprised of a perovskite of the formula $ACe_{0.95}L_{0.05}O_{3-d}$, where A is Ba or Sr, where L is Y or Yb, and where d is such that the perovskite is electrically neutral.

the inorganic particles are comprised of a perovskite of the formula $Sr(Co_{0.8}Fe_{0.2})_{1-x}Ti_xO_{3-d}$ and d is a number such that the perovskite is electrically neutral.

the inorganic particles are comprised of a perovskite of the formula $Ca_xTi_yFeZO_{3-d}$, x, y, and z are non-zero numbers less than 1, and d is a number such that the perovskite is electrically neutral.

the inorganic particles are comprised of a perovskite of the formula $La_x(Ca_nMn_m)_yO_{3-d}$, where x and y are non-zero numbers, where y is >x, and where d is a number such that the perovskite is electrically neutral.

an outside diameter of the sintered hollow fiber is in a range from about 250 to 1500 μm, more particularly 250 to 1000 μm, and a ratio of the outside-diameter to the inside-diameter is in a range of from about 1.20:1.0 to about 3.0:1.0

50% by volume of the inorganic particles have a diameter less than 0.7 μm.

the sintered hollow fiber is gas-tight.

the sintered hollow fiber has a dense, non-porous layer.

the sintered hollow fiber has a porous region and a dense, non-porous layer.

the suspension has a concentration of particulate inorganic material in a range of from about 50 wt. % to about 75 wt. % and a concentration of the copolymer binder in a range of from about 5 wt. % to about 15 wt. %.

the suspension has a concentration of particulate inorganic material in a range of from about 60 to 75 wt. % and a concentration of the copolymer binder in a range of from about 7 wt. % to about 15 wt. %.

the suspension has a concentration of particulate inorganic material in a range of from about 68 to 72 wt. % and a concentration of the copolymer binder in a range of from about 7 wt. % to about 8 wt %.

methane and steam are introduced to an interior of said at least one fiber via said first end cap inlet port, wherein:
the first gas is air;
the second gas comprises syngas comprising hydrogen and carbon monoxide;
the first gas is introduced to an exterior of said at least one fiber via said housing inlet port; and
the second gas is withdrawn from the module via said second end cap outlet port.

the first gas comprises syngas comprising hydrogen and carbon monoxide;

the second gas essentially consists of hydrogen;

the first gas is introduced to an exterior of said at least one fiber via said housing inlet port;

the second gas is withdrawn from said module via said second end cap outlet port;

CO-enriched syngas is withdrawn from said housing outlet port.

the first gas is air;

the second gas comprises oxygen;
the first gas is introduced to an exterior of said at least one fiber via said housing inlet port;
the second gas is withdrawn from said module via said second end cap outlet port; and
nitrogen-enriched air is withdrawn from said housing outlet port.

the second gas essentially consists of oxygen.

introducing a sweep gas to said opposite side of said at least one fiber via said housing inlet port, wherein:
the first gas comprises air and is introduced to an exterior of said at least one fiber via said housing inlet port;
the second gas comprises oxygen-enriched sweep gas and is withdrawn from said module via said second end cap outlet port.

the sweep gas comprises $CO_2$.

the sweep gas comprises steam.

the sweep gas comprises $CO_2$ and steam derived from a flue gas.

BRIEF DESCRIPTION OF THE FIGURES

FIG. 10 is a schematic of portions of the gas separation module.

DETAILED DESCRIPTION OF THE INVENTION

Figure 1:
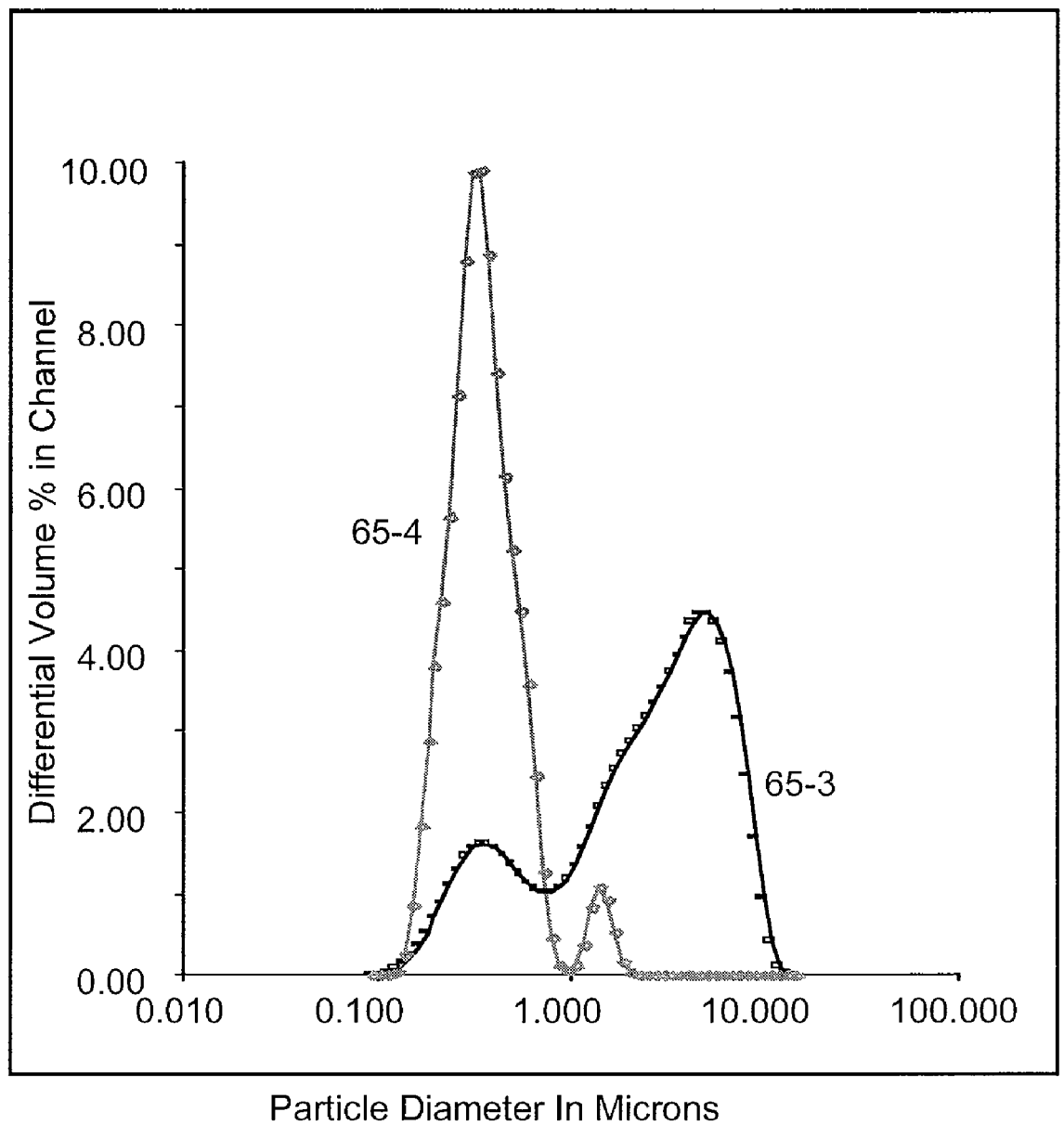
FIG. 1 shows the particle size distribution for a specific Perovskite material before and after attrition milling.

The present invention provides monolithic hollow polymeric/inorganic composite fibers having enhanced strength and ductility, a process for making such fibers, hollow ceramic fibers obtained by sintering such hollow polymeric/inorganic composite fibers, gas separation membrane modules including the hollow composite fibers which are later sintered, gas separation membrane modules including the hollow composite fibers (which may be subsequently sintered in situ), gas separation membrane modules including the hollow sintered fibers, and methods of gas separation using the gas separation membrane modules.

The hollow fibers of the invention exhibit reduced breakage during fiber spinning and subsequent fiber handling steps. The process utilizes copolymers having both "soft-segments" and "hard-segments" in their backbone as the polymeric binder for inorganic particles. The use of soft segments in the copolymer provides elasticity, while the use of hard segments in the copolymer provides tenacity. Thus, the use of copolymers containing both soft and hard segments in their backbone provides precursor fibers exhibiting the improved strength and ductility that are required to prevent breakage during subsequent processing steps, and also enables the precursor fiber to be sintered without cracking of the fiber wall. In comparison, hollow fibers spun from inorganic dispersions containing glassy polymers as the binder tend to be brittle and exhibit impaired processability and ceramic-fiber membrane performance.

In a further embodiment of the invention, the morphology of the precursor hollow-fiber wall is radially anisotropic or asymmetric in that the fiber wall is denser or has lower porosity at the outside fiber surface and the porosity increases moving in from the fiber wall. Alternatively, the fiber wall is less dense or has greater porosity at the outside fiber surface and the porosity decreases moving in from the fiber wall.

The invention further provides a process for making a monolithic hollow polymeric/inorganic fiber that includes the following steps. A suspension of particulate inorganic material, polymeric binder, a solvent for the polymeric binder (and optionally one or more additives such as a dispersing agent) is prepared wherein the polymeric binder includes a copolymer comprising soft segments and hard segments. A spinneret is provided that is adapted and configured to continuously extrude one or more nascent hollow fibers, wherein the spinneret has an inner annular channel disposed concentrically within an outer annular channel. A bore fluid is fed through the inner annular channel to form a cylindrical fluid stream positioned concentrically within the fibers. The suspension is fed through the outer annular channel so that it surrounds the cylindrical fluid stream to form a nascent hollow fiber. The nascent hollow fiber is passed from the spinneret through an air gap. The nascent hollow fiber is immersed in a liquid coagulant to facilitate phase inversion. The fiber is withdrawn from the coagulant and wound onto a take-up roll. The wound fiber is washed to remove residual solvent thereupon. The washed fiber is dried to remove volatile material. Typically, this is done in an oven having an internal temperature of about 100° C.

Polymeric Binder

Embodiments of this invention are directed to precursor polymeric/inorganic hollow fibers that incorporate a polymeric binder comprising certain soft-segment/hard-segment copolymers. A "soft segment" is defined as any monomer that can be used to synthesize a homopolymer exhibiting a glass transition temperature, $T_g$-soft, in the range from −60 to +10° C. wherein such homopolymers would act as elastomers at temperatures above $T_g$-soft. A "hard segment" is defined as any monomer that can be used to synthesize a homopolymer exhibiting a glass transition temperature, $T_g$-hard, above +40° C., wherein such homopolymers would act as a hard glassy material below $T_g$-hard. The percentage by weight of soft-segments present in the copolymer is preferably in the range of 50-95%, and most preferably in the range of 60-90%.

Preferred soft-segment/hard-segment copolymers include poly(ether)urethane-block-polyurethane block copolymers, poly(ether)urethane-block-polyurea block copolymers, poly(ester)urethane-block-polyurethane block copolymers, and poly(ester)urethane-block-polyurea block copolymers. One of ordinary skill in the art will recognize that a block copolymer consists of two or more chemically distinct macromolecular portions (i.e., blocks) joined together to form a single macromolecule.

The poly(ether)urethane-block-polyurethane block copolymers contain polyether-based soft segments in the poly(ether)urethane portion of the block copolymer and polyurethane hard segments in both the poly(ether)urethane and polyurethane portions of the block copolymer. The poly(ether)urethane-block-polyurea block copolymers contain polyether-based soft segments in the poly(ether)urethane portion of the block copolymer, polyurethane hard segments in the poly(ether)urethane portion of the block copolymer, and polyurea hard segments in the polyurea portion of the block copolymer. For such poly(ether)urethane-block-polyurethane and poly(ether)urethane-block-polyurea block copolymers, one of ordinary skill in the art will recognize that the hard segments refer to the portions of the polymer chains that are derived from reaction of the terminal diisocyanate groups of the segmented polyurethane polymer with an appropriate diamine or diol, or with a mixture of a diamine or diol, and an appropriate diisocyanate.

The poly(ester)urethane-block-polyurethane block copolymers contain polyester-based soft segments in the poly(ester)urethane portion of the block copolymer and polyurethane-based hard segments in both the poly(ester)urethane portion of the block copolymer and the polyurethane portion of the block copolymer. The poly(ester)urethane-block-polyurea block copolymers contain polyester-based soft segments in the poly(ester)urethane portion of the block copolymer, polyurethane-based hard segments in the poly(ester)urethane portion of the block copolymer, and polyurea-based hard segments in the polyurea portion of the block copolymer. One of ordinary skill in the art will in this case recognize that the soft segments are made from the reaction of an appropriate aliphatic or aromatic diol or polyether glycol with the appropriate aliphatic or aromatic diacid derivative. Similarly, one of ordinary skill in the art will recognize that the hard segments are derived from reaction of the terminal diisocyanate groups of the segmented polyurethane polymer with an appropriate diamine or diol, or with a mixture of a diamine or diol, and an appropriate diisocyanate.

Particularly preferred embodiments of this invention incorporate polymeric binders comprising certain poly(ether)urethane-block-polyurethane, poly(ether)urethane-block-polyurea, poly(ester)urethane-block-polyurethane, and poly(ester)urethane-block-polyurea block copolymers in which one portion of the block copolymer is represented by the repeating units of formula (Ia) and the other portion of the block copolymer is represented by the repeating units of formula (Ib):

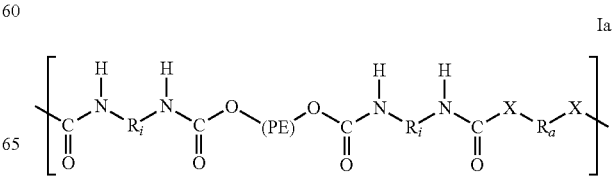

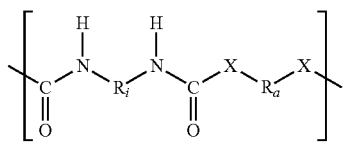

in which each $R_i$ is independently an aliphatic or aromatic radical of at least about 2-18 carbon atoms; each (PE) is independently a polyether ($PE_{ether}$) or polyester ($PE_{ester}$) having a weight average molecular weight, $M_w$, ranging from about 600 to 8000, and preferably about 1000 to 4000; each $R_a$ is independently a linear or branched aliphatic radical of at least about 2-18 carbon atoms; and, X is O or NH. As noted above, each $R_i$ need not be identical, each PE need not be identical, and each $R_a$ need not be identical. One of ordinary skill in the art will recognize that block copolymers having non-identical $R_i$'s, PE's, and $R_a$'s may be synthesized using mixtures of reagents. However, for ease of synthesis, each $R_i$ may be the same, each PE may be the same, and each $R_a$ may be the same. The number of repeating units of formula (Ia) in each block copolymer chain ranges from 5 to 200 and preferably from 10 to 100.

If X is O, the block copolymer is a poly(ether)urethane-block-polyurethane or poly(ester)urethane-block-polyurethane, and if X is NH, the block copolymer is a poly(ether)urethane-block-polyurea or poly(ester)urethane-block-polyurea. The number of polyurea or polyurethane repeating units represented by formula (Ib) ranges from 1 to 400, and preferably about 1 to 200.

The exact nature of the polymers depends on the composition and amount of each ingredient and order of addition during polymer synthesis. For example, if essentially stoichiometric amounts of an aliphatic or aromatic diisocyanate (in slight excess) and a polyethyleneglycol are reacted, and then a stoichiometric amount of an aliphatic diamine is subsequently added (X═NH), the resultant polymer is a urea-endcapped poly(ether)urethane/polyurea represented by repeating units of formula (Ia). Polymers with the tradename Lycra® fall within this class. If, in the above scheme, after the aliphatic or aromatic diisocyanate and polyethyleneglycol are reacted and a mixture of aliphatic diamine plus aromatic diisocyanate is subsequently added to the reaction mixture, the resultant product is a poly(ether)urethane-polyurea block copolymer represented by the repeating units of formula (Ia) and repeating units of formula (Ib).

Similarly, following the above synthetic scheme to the end, with X being oxygen, the resulting block copolymer is a poly(ether)urethane-block-polyurethane. Similarly, if a hydroxy-terminated polyester is substituted for the polyethyleneglycol in the aforementioned scheme, the resulting block copolymer is a poly(ester)urethane-block-polyurethane. Polymers with the tradename Estane® 5708 fall within this class.

In these examples, the "soft" segment of the polymer is represented by the repeating units (PE) of formula (1a); and the "hard" segments are represented by portions of the polymer chain of formula (Ia) other than the units (PE), and the repeating units represented by formula (Ib).

Thus, to one skilled in the art, it is evident that various polymeric structures can be synthesized based on the ingredients used and order of addition.

In a preferred embodiment of the invention, $R_i$ is a moiety of composition selected from the group consisting of formula (S), formula (T), formula (U), or formula (V) below, and a combination or mixtures thereof.

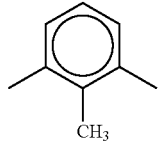

(S)

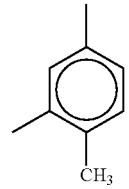

(T)

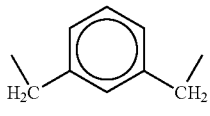

(U)

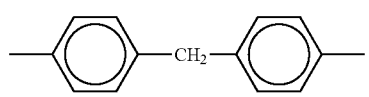

(V)

These structures correspond to tolylene-2,6-diisocyanate, tolylene-2,4-diisocyanate, 1,3-xylylenediisocyanate, and 4,4'-methylene-bis(phenylisocyanate), respectively.

The soft segment of the block copolymer is derived from a polyether ($PE_{ether}$) or aliphatic polyester ($PE_{ester}$).

It has been discovered that the composition and molecular weight of the polyether segment, ($PE_{ether}$), affects the physical characteristics of the resulting poly(ether)urethane-block-polyurethane and poly(ether)urethane-block-polyurea block copolymers. Thus, the polyether segment is derived preferably from a polyether diol of weight average molecular weight of about 600-8000, and more preferably about 1000-4000. Preferred polyether diols are hydroxyl terminated polyethylene glycol, hydroxyl terminated 1,2-polypropylene glycol, hydroxyl terminated 1,3-polypropylene glycol, and hydroxyl terminated 1,4-polybutylene glycol, although other diols known or used by one skilled in the art may be used. In a preferred embodiment, the preferred polyether diol is hydroxyl terminated 1,4-polybutylene glycol.

Similarly, the composition and molecular weight of the polyester segment, ($PE_{ester}$), affects the physical characteristics of the resulting poly(ester)urethane-block-polyurethane and poly(ester)urethane-block-polyurea block polymers. Thus, the polyester segment is derived preferably by the polycondensation of a linear or branched aliphatic diol of 2-18 carbon atoms with a linear or branched aliphatic diacid of 2-18 carbon atoms. Typical diols are ethylene glycol, 1,3-propanediol, 1,2-propanediol, 1,4-butanediol, and 1,6-hexanediol, although other diols known or used by one skilled in the art may be used. Preferred diacids are succinic acid and adipic acid, although other diacids known or skilled in the art may be used.

The hard segment of formula (Ia) is derived from the reaction of at least one aliphatic diol or at least one aliphatic diamine with the terminal isocyanate group from the preliminary reaction of the polyetherdiol or polyesterdiol segment (PE) with an aliphatic or aromatic diisocyanate. The hard segment represented by formula (Ib) is derived from the reaction of at least one aliphatic diol or diamine with at least one aliphatic or aromatic diisocyanate. Preferred diols or diamines contain at least about 2-18 carbon atoms and can be linear or branched. Most preferred are diols or diamines containing at least about 2-6 carbon atoms. Typical diols and diamines are ethylene glycol, 1,3-propanediol, 1,2-propanediol, 1,4-butanediol, 1,6-hexanediol, 1,2-diaminoethane, 1,4-diaminobutane, 1,5-diaminopentane, 1,5-diaminohexane, and 1,6-diaminohexane, although other diols and diamines known or used by one skilled in the art may be used. The number of polyurea or polyurethane repeating units in the hard segment represented by formula (Ib) of the block copolymer ranges from 1 to 400, and preferably about 1 to 200.

Typically, the preferred block copolymers of this invention exhibit a weight average molecular weight in the range from about 23,000 to 400,000 and preferably about 50,000-280,000. As shown from the variety of combinations of components, a wide range and variety of types of poly(ether)urethane-block-polyurethane, poly(ether)urethane-block-/polyurea, poly(ester)urethane-block-polyurethane, and poly(ester)urethane-block-polyurea block copolymers are contemplated and disclosed herein.

Especially preferred block copolymers include those obtained under the following trade names from the following companies: Lycra L-162 from DuPont, Elastollan 1180A from BASF, Estane 5714 from Noveon, Estane 5708 from Noveon.

Whether or not a block copolymer as described above is used as the copolymer of the invention, it has also been discovered that the ratio of soft segments to hard segments is important to the ductility of the precursor polymeric/inorganic composite hollow fiber and the ability to spin small-diameter hollow fibers. Preferably, the soft segment comprises about 50-95 weight % of the copolymer, and most preferably, about 60-90 wt %, the balance being that of the hard segment.

Inorganic Material

The inorganic material of the precursor polymeric/inorganic hollow composite fibers may be any metallic or ceramic material (including glasses). The selection of the inorganic material is dependant on the final application for the hollow fiber. For example, sintered metallic microporous hollow fibers or ceramic micro-porous hollow fibers can be used for micro- or ultrafiltration of liquids or gases. Sintered metallic (such as Palladium or a Palladium alloy) hollow fibers that are dense and non-porous or which have a porous region and a dense, non-porous layer may be used for separation of $H_2$ from a $H_2$-containing gas mixture. Sintered ceramic hollow fibers that are dense and non-porous or which have a porous region and a dense, non-porous layer may also be used for gas separation or syngas production. Depending upon the particular ceramic material used, this group of sintered hollow fibers may be used as either proton transport membranes or oxygen transport membranes. Preferably, the inorganic material is a perovskite.

A first group of inorganic materials includes the non-limiting list of metals: Al, Zn, Pt, Cr, and Fe.

A second group of inorganic materials includes the following perovskites:
  perovskite-type oxides such as $BaCe_{1-x}M_xO_{3-d}$, where M is a metal dopant and x is greater than 0 but less than 1 and d is such that the material is electrically neutral; an example of which includes the perovskite $ACe_{0.95}M_{0.05}O_{3-d}$, where A is Ba or Sr, and M is Y or Yb.

A third group of inorganic materials includes the following:
  Ba-doped $CeO_3$+a metal (e.g. Nickel)
  a mixture of YSZ (ionic conductor) and Pd (or one of Pt, Ni, Ag, Au)
  a mixture of $RE_2O_3$ doped $CeO_2$ ionic conductor (where RE=Y, Yb, Sc, or Gd) and Pd (or one of Pt, Ni, Ag, Au). Other examples of two-phase mixed conductors include LSGM ($La_{1-x}Sr_xMg_yGa_{1-y}O_3$)+Ni or LSGM+Pd
  $La_{0.9}Sr_{0.1}Ga_{0.8}Mg_{0.2}O_{3-d}$+Pd (preferably a 50%/50% mixture where d is a number such that the $La_{0.9}Sr_{0.1}Ga_{0.8}Mg_{0.2}O_{3-d}$ is electrically neutral A fourth group includes glasses, in particular, porous glass such as that disclosed at paragraphs 11-12 in US 20070151450A, the entire contents of which are incorporated herein by reference.

A fifth group of inorganic materials includes the following:
  a perovskite of the general formula $(Ln_{1-x}A_x)_w(B_{1-y}B'_y)O_{3-d}$, wherein Ln represents one or more elements selected from the group consisting of La, the D block lanthanides, and Y; wherein A represents one or more elements selected from the group consisting of Mg, Ca, Sr, and Ba; wherein B and B' each represent one or more elements selected from the group consisting of Sc, Ti, V, Cr, Mn, Fe, Co, Ni, Zr, and Ga; wherein $0 \leq x \leq 1$, $0 \leq y \leq 1$, and $0.95 \leq w \leq 1.05$; and wherein d is a number that renders the compound charge neutral
  a perovskite of the formula $La_{0.8}Sr_{0.2}Fe_{0.7}Co_{0.3}O_{3-d}$ where d is a number such that the perovskite is electrically neutral
  a perovskite of the formula $Ba_{0.5}Sr_{0.5}Fe_{0.2}Co_{0.8}O_{3-d}$ (BSCF) where d is a number such that the perovskite is electrically neutral
  strontium doped lanthanum iron cobalt oxide of the composition $La_{(1-x)}Sr_xCo_{(1-y)}Fe_yO_{3-d}$; where $0<x<1$ and $0<y<1$; with preferred composition range of $0<x<0.4$ and $0<y<1$ (these are also referred to as LSCF membranes) and d is a number such that the $La_{(1-x)}Sr_xCo_{(1-y)}Fe_yO_{3-d}$ is electrically neutral. Ca may also be used as the dopant instead of Sr, i.e. $La_{(1-x)}Ca_xCo_{(1-y)}Fe_yO_{3-d}$ ($0<x<1$ and $0<y<1$). The site occupied by Co and Fe may also be substituted by Cr and Ni, for example $La_{(1-x)}Sr_xCo_{y1}Fe_{y2}Ni_{y3}Cr_{y4}O_{3-d}$ ($x<1$ and $y1+y2+y3+y4=1$)
  yttria stabilized zirconia (YSZ) doped with an oxide chosen from: $MnO_2$, $TiO_2$, FeO, $Cr_2O_3$ or other transition metal oxides. Yet another example is undoped $CeO_2$ or $CeO_2$ doped with an oxide chosen from $MnO_2$, $TiO_2$, FeO, $Cr_2O_3$ or other transition metal oxides.
  the perovskite $La_{0.8}Sr_{0.2}Fe_{0.7}Ga_{0.3}O_{3-d}$ and d is a number such that the perovskite is electrically neutral
  the perovskite $La_{0.8}Sr_{0.2}Fe_{0.7}Co_{0.3}O_{3-d}$, wherein d is a number such that the perovskite is electrically neutral
  the perovskite $BaCe_{1-x}M_xO_{3-d}$, where M is a metal dopant, x is greater than 0 but less than 1, and d is a number such that the perovskite is electrically neutral
  the perovskite $ACe_{0.95}L_{0.05}O_{3-d}$ where A is Ba or Sr, where L is Y or Yb, and where d is such that the perovskite is electrically neutral
  the perovskite $Sr(Co_{0.8}Fe_{0.2})_{1-x}Ti_xO_{3-d}$ and d is a number such that the perovskite is electrically neutral
  the perovskite $Ca_xTi_yFe_zO_{3-d}$, x, y, and z are non-zero numbers less than 1, and d is a number such that the perovskite is electrically neutral
  the perovskite $La_x(Ca_nMn_m)_yO_{3-d}$ where x and y are non-zero numbers, where y is >x, and where d is a number such that the perovskite is electrically neutral The inorganic material particle size should be small enough to provide a relatively uniform dispersion of the particles in the polymer solution from which the polymeric/inorganic precursor hollow fiber will be formed. It should also be small enough to obtain a relatively uniform distribution of the inorganic particles in the precursor hollow fiber. Moreover, it should be small enough so that plugging of a spinnerette is avoided. Typically, the maximum grain size will not exceed one tenth of the narrowest gap in the spinnerette through which the suspension travels. The grain size is selected such that at least a highly dense layer in the unsintered precursor hollow fiber is achieved.

Generally speaking, the median particle size should be less than about 4 μm, preferably less than 2 μm, and more preferably less than 1 μm. Large agglomerates should be reduced to less than about 10 μm and preferably less than about 1 μm. It has been found that a more defect-free hollow fiber can be produced when the average particle size is less than about 1 μm and the particle size distribution is narrow. It is advantageous that the inorganic particles exhibit a narrow distribution in particle size, e.g., at least 99% by volume of the inorganic particles have a particle size between 0.1 μm and 1.0 μm. More particularly, it is desirable to have no particles (agglomerates or grains) above 2 μm. However, the grain size distribution should not be too narrow because the particle packing might otherwise not be optimized and satisfactory sintering might not be achieved. The grain size distribution preferably has the following parameter: $0.2<d50<0.7$ μm. Another parameter of the inorganic material to keep in mind is the specific area which preferably is in the range of from 6-28 $m^2/g$.

An especially optimal particle size distribution is one in which no particles exceed 3 μm in size and in which there are two groups of similarly sized particles, i.e., large particles and small particles. This is desirable for achieving a relatively high degree of uniformity of packing and enhanced green density because the smaller sized particles fit in the otherwise empty spaces in between the larger sized particles.

Very fine inorganic particles may be made by various techniques such as by choosing appropriate synthesis conditions and/or by physical size reduction methods well known to those of ordinary skill in the art, such as attrition milling, ball milling, wet-milling, and ultrasonication. When starting from hard agglomerates of a ceramic material, the preferred physical size reduction technique is attrition milling. Generally speaking, the best physical size reduction results are achieved when starting with inorganic particles having a generally round shape. This is typically the case for ceramic particles produced by spraying a solution of the ceramic precursor materials in a high temperature flame, for example 1,100° C., produced by an oxy-acetylene burner. A more rounded shape will provide greater, more uniform shearing during physical size reduction as well. Also, a more rounded shape tends to produce organic/inorganic composite fibers with fewer physical defects.

Preferably, after physical size reduction the inorganic particles are calcined in order to remove undesirable substances adsorbed thereupon. Typically, this is performed by subjecting the inorganic particles to a temperature of 650° C. for 2 hours.

Various liquid media can be employed during the milling process, such as water; organic liquids, such as methanol, ethanol, isopropanol, n-methylpyrrolidone (NMP), dimethylacetamide (DMAC), ethylene glycol, mono- and diethers of ethylene glycol, diethylene glycol, mono- and diethers of diethylene glycol, or any liquid suitable for the milling process. The selection of liquid media will affect the speed with which the polymeric portion of the composite fiber hardens and consequently the degree to which the density of the fiber in the radial direction is asymmetric. Generally speaking, the greater the solubility of the liquid media in the coagulant bath liquid, the faster the liquid media will become extracted into the coagulant. The polymeric portion of the composite fiber will then harden faster accordingly. Also, the greater the solubility of the liquid media in the coagulant bath liquid, the faster the coagulant bath liquid travels through the fiber. In comparison to slower travel of the coagulant bath liquid through the fiber, faster travel will tend to result in greater asymmetry of density in the radial direction and greater prevalence of macrovoids in the fiber. On the other hand, slower travel of the coagulant bath through the fiber will lessen the tendency to form macrovoids but it may be so slow as to prevent sufficient hardening of the fiber at downstream processing equipment. As a result, it may stick to the downstream processing equipment. A suitable compromise of these phenomena is achieved using a liquid media that is relatively highly soluble in the coagulant bath liquid while at the same time using a substance in the coagulant bath that lowers the osmotic pressure of the coagulant liquid in the fiber, such as a salt. Thus, the liquid media is quickly removed from the fiber and the coagulant bath liquid moves at a more moderate speed through the fiber. The preferred liquid media is ethanol. A preferred corresponding coagulant bath liquid would be water with a salt, for example 15% by wt. of lithium nitrate or sodium chloride.

A dispersing agent may be added to the milling process to prevent agglomeration of the inorganic particles and to stabilize grain size distribution. Typical dispersing agents are cationic and anionic surfactants; and polyelectrolytes, such as polyphosphates and polycarboxylic acid derivatives. Many other dispersants are well known to those of ordinary skill in the art and need not be recited herein. There should be at least a minimal amount of reactivity between the inorganic particles and the dispersing agent. The optimal amount of dispersing agent will depend to a certain degree upon the specific surface area of the inorganic material. As the specific surface area of the inorganic material increases, the number of reaction sites existing on available surfaces will increase. As a result, a greater amount of dispersing agent will be needed. Conversely, the lower the specific surface area of the inorganic material, the less dispersing agent will be needed. Two examples of dispersing agents include Phospholane PE 169 (available from Akzo Nobel) used at a concentration of 0.1 to 2.0 wt. % based on dry inorganic powder and 2-(2-(2-methoxyethoxy)ethoxy)acetic acid used at a concentration of 0.9% by wt based upon the total of organic binder, inorganic powder, solvent, and other additives.

Solvent Selection

The solvent to be used in the preparation of the polymer solution should be a good solvent for the organic polymer, should provide a stable suspension of the inorganic particles, and should be compatible with the overall fiber spinning process. Solvents such as N-methylpyrrolidone (NMP), N,N-dimethylacetamide (DMAC), N,N-dimethylformamide (DMF), dimethyl sulfoxide (DMSO), gamma-butyrolactone (BLO) and glycol ethers or esters are particularly useful with the polymers of this invention.

The suspension containing the polymer, solvent and inorganic material can be prepared by mixing the polymer, inorganic material, and solvent together; or by suspending the inorganic material in the solvent first, followed by the addition of the solid polymer; or by adding the inorganic material to a solution of the polymer in the solvent. It is preferred to dissolve the polymer in the solvent first, followed by addition of the inorganic material. To facilitate polymer dissolution, temperatures higher than ambient may be desirable.

Typically, the concentration of inorganic material in the dispersion ranges from 50 to 75 wt. %, and the concentration of the polymer ranges from 5 to 15 wt. %, the remainder being solvent, and optional plasticizer and/or dispersant. Preferably in the suspension, the inorganic material is from 60 to 75 wt. %, and polymer 7 to 15 wt. %. Most preferably in the suspension, the inorganic material is from 68 to 72 wt. %, and polymer 7 to 8 wt. %. Typically, the ratio of inorganic material to polymer ranges from about 7:1 to about 12:1. One of ordinary skill in the art will recognize that the upper concentration limit of inorganic material in the dispersion may be empirically determined without excessive experimentation by slightly varying the inorganic material content and observing the fiber's ability to stay cohesive while being drawn. The upper limit will ultimately depend upon the specific compositions selected for the binder and inorganic material.

It is preferable that the inorganic material is uniformly suspended throughout the polymer solution. Sufficient mixing is important during the suspension preparation to achieve uniform suspension. Incorporation of dispersing agents additives such as surfactants and polyelectrolytes also serve to facilitate and maintain uniform dispersion. Other optional additives include one or more plasticizers.

Extrusion of the Suspension

In making the precursor polymeric/inorganic hollow fibers from the suspension described above, a wide variety of extrusion or fiber spinning conditions may be employed. A typical procedure for producing hollow fibers of this invention can be broadly outlined as follows a) Preparing a suspension of the inorganic material, polymeric binder, and solvent for said polymeric binder;
b) Providing a spinneret adapted to continuously extrude one or more nascent hollow fibers;
c) Feeding a bore fluid through an inner annular channel of the spinneret designed to form a cylindrical fluid stream positioned concentrically within the fibers during extrusion of the fibers;
d) Feeding the polymeric/inorganic suspension through an outer annular channel of the spinneret so that it surrounds the bore fluid to form a nascent polymeric/inorganic hollow fiber;
e) Passing the nascent polymeric/inorganic hollow fiber from the spinneret through an air gap;
f) Immersing the nascent polymeric/inorganic hollow fiber in a suitable liquid coagulant to facilitate phase inversion;
g) Withdrawing the fiber from the coagulant;
h) Winding the fiber onto a rotating take-up roll, drum, spool, bobbin or other suitable conventional collection device;
i) Washing the fiber to remove residual solvent; and
j) Drying the fiber to remove volatile material.

The bore fluid is preferably water, but a mixture of water and an organic solvent (for example NMP) may be used as well.

An important aspect of the extruding, immersing, and winding steps includes controlling the ratio of solidified fiber windup rate to nascent fiber extrusion rate. This ratio is also sometimes called "draw ratio" and is more precisely described below. One of ordinary skill in the art will recognize that the combination of spinneret dimensions and draw ratio serve to control the fiber dimensions to the desired specifications.

Exemplary conventional processes for producing polymeric hollow fibers are disclosed in U.S. Pat. No. 5,015,270 and U.S. Pat. No. 5,102,600, the entire disclosures of which are hereby incorporated by reference herein.

A number of different designs for hollow fiber extrusion spinnerets known in the art may be used. Suitable embodiments of hollow-fiber spinneret designs are disclosed in U.S. Pat. No. 4,127,625 and U.S. Pat. No. 5,799,960, the entire disclosures of which are hereby incorporated by reference.

An aspect of the present invention will now be explained with reference to an embodiment of a spinneret which is disclosed in U.S. Pat. No. 5,799,960.

After leaving the spinneret, the fiber velocity is accelerated in the air gap from the extrusion velocity at the spinneret exit to a wind-up velocity, which is regulated by the speed of the wind-up device. The wind-up velocity is usually adjusted to elongate the fiber and to draw down the diameter of the nascent hollow fiber in the air gap to essentially the desired finished fiber diameter. Upon entering the coagulation bath, the polymeric solution phase of the nascent polymeric/inorganic fiber undergoes phase inversion leading to eventual "solidification" of the fiber structure before being wound up on the wind-up device (take-up roll).

A commonly used parameter for characterizing the degree of extensional deformation that the fiber experiences in the air gap is referred to as the "draw ratio". This is defined as the ratio of wind-up velocity to the average extrusion velocity. The average extrusion velocity is defined as the volumetric flow divided by the cross sectional area of the annular fiber channel. According to this definition, the fiber inner and outer dimensions are reduced with increasing draw ratio for a particular spinneret geometry and total volumetric flow rate of the bore fluid and the dispersion. Fiber deformation resulting from draw-down is beneficial because it provides the capability of smaller-diameter fiber for a particular spinneret geometry. Another potential advantage is that the fiber mechanical properties may be enhanced due to the extensional orientation of the polymer chains in the polymer solution phase.

Decreasing draw ratio on the other hand results in larger fiber diameters. In the limit, wind-up velocity approaches the so-called free-fall spinning velocity at which the fiber elongates in the air gap only due to the force of gravity. During spinning at free-fall or low-draw ratio velocities, the nascent fiber experiences significantly reduced extensional stress and reduced polymer extensional orientation.

Preferably the draw ratio should be from about 1:1 to about 12:1, more preferably from about 1:1 to about 10:1, even more preferably from about 5:1 to about 10:1.

The diameter of the polymeric/inorganic precursor fiber can be further controlled by the size of the hollow fiber spinnerets. The outside diameter of the spinneret can be from about 400 μm to about 2000 μm, with bore solution capillary-pin outside diameter from 200 μm to 1000 μm. The inside diameter of the bore solution capillary is determined by the manufacturing limits for the specific outside diameter of the pin. It should be noted, however, that the difference between the outside diameter of the spinnerette and the bore solution capillary-pin outside diameter should preferably be at least 10 times the particle size of the largest particles in the inorganic material. Otherwise, there may be a tendency to plug up the spinnerette.

The temperature of the solution during delivery to the spinneret and during spinning of the hollow fiber depends on various factors including the desired viscosity of the dispersion within the spinneret and the desired fiber properties. At higher temperature, viscosity of the dispersion will be lower, which may facilitate extrusion. At higher spinneret temperature, solvent evaporation from the surface of the nascent fiber will be higher, which will impact the degree of asymmetry or anisotropy of the fiber wall. In general, the temperature is adjusted to maintain the desired viscosity of the dispersion and the fiber wall asymmetry. A preferred range is from about 20° C. to about 100° C., preferably from about 20° C. to about 60° C.

The skilled artisan will of course recognize that the fibers can be extruded through a plurality of spinnerets to enable the concurrent formation of multiple fibers on a common piece of equipment.

Fiber Collection

Typically in the spinning process, the fiber is extruded out the bottom of the spinneret and either falls at free-fall velocity or is drawn downward through an air gap and immersed into a quench bath containing liquid coagulant. The coagulant constitutes a non-solvent or a poor solvent for the polymer while at the same time a good solvent for the solvent within the dispersion. Suitable liquid coagulants include water (with or without a water-soluble salt) and/or alcohol with or without other organic solvents. A preferred liquid coagulant is water. As a result, the solvent for the polymer is extracted from the nascent fiber causing the polymer to solidify as it is drawn through the quench bath. The fiber is guided within the quench bath by a series of rollers or guides that maintain sufficient tension on the fiber to follow a straight path. There may be additional guides or rollers that guide the fiber to a suitable collection apparatus or winder upon exiting the bath. During this process, the fiber is under tension and is in direct contact with the various guides and/or rollers. During the process, the fiber must have sufficient strength to avoid undue stretching or, in the worse case, breaking.

The rubbery copolymers of this invention significantly enhance the ductility of the nascent fiber so that it can be traversed around the fiber guides within the quench bath and collected on a take-up roll. In essence, the use of a polymer with a degree of rubbery character enables continuous spinnability of the precursor hollow fiber without breakage. The mechanical properties of the fibers spun with the hard-segment/soft-segment copolymers are superior to those using a purely elastomeric polymer (e.g., soft segments only) or glassy polymers (hard segments only). The copolymers of this invention provide both the ductility (provided by the soft segments) needed to prevent brittle fracture of the polymeric/inorganic hollow fibers and the strength needed to withstand the forces applied to the fiber during fiber spinning and handling. Thus the fibers of this invention are capable of withstanding both tensile forces and bending forces. Typically, the fibers of this invention have a percent elongation at break of at least 2.0%. Preferably the dried fibers of this invention exhibit an elongation percent at break of in a range of from about 2% to about 5%. In contrast, polymeric/inorganic fibers made with rubbery polymers or with glassy polymers as the binder tend to exhibit an elongation percent at break of less than 2% and are brittle and prone to breaking during handling.

Sintering

The dried, washed, wound, solidified fiber (i.e., the "green fiber") may be sintered to provide a sintered ceramic fiber. In the case of a fiber containing $LaSrFeGaO_{3-d}$ (where d is such that the material is electrically neutral) as the inorganic material, a preferred temperature profile for sintering is as follows:

ramping the temperature from room temperature to 400° C. at a rate of 5° C./min
    ramping the temperature from 400° C. to 500° C. at a rate of 1° C./min
    dwell time of one hour at 500° C.
    ramping the temperature from 500° C. to 1350° C. at a rate of 5° C./min
    dwell time of two hours at 1350° C.

However, it should be noted that the times, temperatures, and temperature ramp rates in the sintering cycle may be optimized based upon the particular organic and inorganic materials used as well as the particle size distribution of the inorganic material. Thermogravimetric analysis of the organic material may be performed in a manner well known to those skilled in the art to establish the times, temperatures, and temperature ramp rates for the organics burnoff phase of the sintering cycle. Also, generally speaking a relatively small grain size of the inorganic material (and associated high surface area) tends to inhibit removal of the organic material, so in such a case the temperature ramp rates should be relatively lower and the dwell times increased. On the other hand, in the sintering phase, a relatively small grain size (and associated high surface area) will tend to increase the speed of sintering, so the dwell times in such a case should be relatively lower. Dilatometry analysis (also called thermal expansion analysis) of the green fiber may be performed in a manner well known to those skilled in the art to establish the times, temperatures, and temperature ramp rates for the sintering phase of the sintering cycle. In such analysis, the size of a piece of the green fiber is recorded as the temperature is raised. The initiation of sintering is indicated when a very fast decrease of the sample size is recorded. Preferably, the final dwell temperature is at least 1200° C.

Upon completion of sintering, the fiber is gas-tight. The term "gas-tight" means that if the interior of the fiber is pressurized, no escape of the pressurization gas from the external circumferential surface of the fiber can be detected.

Gas Separation Membrane Module

As best illustrated in FIG. 10, the ends of a plurality of sintered hollow ceramic fibers 1 are carefully inserted through holes 4 formed through a tubesheet 3. Alternatively, the fibers need not be sintered before insertion through the holes 4, in which case the fibers are sintered after the module has been assemble. The fiber insertion step is repeated for the opposite ends with another tubesheet 3 having identical holes 4. While not depicted in the perspective schematic of FIG. 10, free ends of the fibers 1 extend through the face of the tubesheet 3 not shown, thus allowing gas to flow from one end of the fiber through the opposite end. The arrangement of tubesheets 3 and fibers 1 are then placed within a cylindrically shaped housing (not shown) as is conventionally known in the gas separation membrane field. In order to provide a suitable gas separation membrane, one of ordinary skill in the art will recognize that the diameter of the housing is sized to facilitate formation of a gas-tight seal between the outer circumferential surfaces of the tubesheets 3 and the inner surface of the housing. Such a one will further recognize that the housing should be long enough such that the fibers 1 do not extend out of open ends of the housing. End caps 6 are then placed over the open ends of the housing. Each of the end caps 6 have at least one port formed therein for introduction of a first gas and withdrawal of a third gas. The housing also has at least one port formed therein for withdrawal of a second gas. One of ordinary skill in the art will recognize that other configurations may be employed other than that illustrated in FIG. 10.

In order to provide a suitably effective gas separation membrane, it is necessary to provide a substantially gas-tight seal at several interfaces of the thus-formed gas separation membrane module, including: a) the interface between outer surfaces of each of the fibers 1 and inner surfaces of the tubesheets 3 at each of the holes 4, b) the interface between outer circumferential surfaces of the tubesheets 3 and an inner surface of the housing, and c) the interface between each of the ends of the housing and the end caps 6. These gas-tight seals may be produced by any of the known methods for achieving a high-temperature, gas-tight seal between ceramic and/or metal materials. One non-limiting method of doing so (See: S. Liu, G. R. Gavalas, Oxygen Selective Ceramic Hollow Fiber Membranes, *Journal of Membrane Science*, 246 (2005) 103-108; and T. Schiestel et al, Hollow Fibre Perovskite Membranes For Oxygen Separation, *Journal of Membrane Science*, 258 (2005) 1-4) is by application of a paste of a particulate metal (such as gold or silver) dispersed in a polymeric binder at each of the interfaces, sintering (and subsequent cooling) of the parts to be sealed. Due to the high temperature of the sintering step, the binder is volatilized/burned/pyrolized and the metal softens or melts and flows into the interface. Upon cooling, the metal forms a gas-tight seal. Other suitable metals include copper, nickel, palladium, or platinum. The metal paste may also be substituted with a glass, glass/ceramic or ceramic sealing composition, in which case the coefficient of thermal expansion of the sealant (after sintering) is preferably the same as, or intermediate those of, the two items for which a gas-tight seal is sought to be produced. Another non-limiting method of doing so (See: US 20010033060 A1) is by compression-fitting an inorganic sealing element in between the items for which a gas-tight seal is sought to be produced.

Gas Separation Methods

In use, a first gas is introduced one side of the fibers 1: the interior (bore) or the exterior. A second gas is withdrawn from an opposite side of the fibers 1. Depending upon which inorganic material (such as a metal such as Palladium or a Palladium alloy or various types of ceramics) is used, the gas separation membrane module may be used to separate oxygen from an oxygen-containing gas mixture (in which case it is considered an oxygen transport membrane) or to separate hydrogen from a hydrogen-containing gas mixture (in which case it is considered a proton exchange membrane), or to react with methane with oxygen that transported from one side of the fiber 1 to an opposite side of the fiber 1 (in which case it is considered a syngas reactor). So, depending upon whether the inorganic material is a proton-conducting or oxygen-conducting material, either hydrogen or oxygen is transported from one side of the fiber 1 to an opposite side of the fiber 1.

In one embodiment, a gas separation module including an oxygen transport membrane may also be used to separate oxygen from an oxygen-containing gas mixture. In one sub-embodiment, the gas separation membrane module may be heated with the products of combustion from combustion of a fuel and an oxidant to provide the necessary high temperature for conducting oxygen transport and the oxygen produced by the module may be used to feed the combustion process with oxidant. In that sub-embodiment, a sweep gas is introduced to the non-air side of the membrane. While the sweep gas can be any gas that does not interfere with combustion, the sweep gas is preferably at least a portion of the products of combustion, such as steam and/or $CO_2$. In this manner, one may produce an oxidant having an oxygen concentration less than 100%, such as synthetic air. In that sub-embodiment, the products of combustion comprise steam and/or $CO_2$. In this situation, air is fed to the membrane via an inlet port in the housing and into a space defined by outer surfaces of the fibers 1 and the inner surface of the housing in between each of the tubesheets 3. Oxygen from the air is transported to the interior of the fiber 1. The sweep gas is introduced into interior of the fiber 1 via the inlet port in one of the end caps 6 where it combines with the oxygen in the interior of the fiber 1. The thus-produced oxygen-enriched sweep gas then flows through the fiber 1 and out of the outlet port formed in the other of the end caps 6 for introduction into a combustion chamber. The oxygen-deficient and nitrogen-enriched portion of the first gas (i.e., the residue or retentate gas) flows out of the outlet port in the housing. In another sub-embodiment, oxygen is separated from air and no sweep gas is involved. This latter sub-embodiment operates in a manner similar to the above sub-embodiment, but of course no sweep gas is introduced to the membrane and no oxygen enrichment of a sweep gas is involved.

Alternatively, in the above embodiment, the air can be introduced to the membrane so that oxygen is transported from an interior of the fiber to an exterior in which case the thus-produced oxygen or oxygen-enriched sweep gas is removed from an outlet port formed in the housing. It should be noted, however, that the air is preferably introduced to the exterior of the fiber 1 as explained above in order to avoid rupturing of the fiber 1 due to over-pressurization.

In another embodiment, a gas separation module including an oxygen transport membrane may be used as a reactor to produce syngas (hydrogen and carbon monoxide) by introducing air to one side of the membrane and methane and optionally steam to another side of the membrane under high temperature. Oxygen from the air is transported to the methane side where it partially oxidizes the methane to syngas or facilitates steam reforming of the methane. Because an oxygen-transport membrane is used, the syngas contains substantially no nitrogen. In this situation, the first gas comprises methane (and optionally steam) and is introduced to the interior of the fiber 1 via the inlet port formed in the first end cap 6. Air is introduced to the membrane via the inlet port formed in the housing and into the space defined by the outer surface of the fibers 1 and the inner surface of the housing and the inner planar surfaces of the end caps 3. Oxygen from the air is transported from this space to the interior of the fiber 1 where it reacts with methane (and optionally steam) to produce syngas: hydrogen and carbon monoxide. The thus-produced syngas then flows out flows out of the opposite end of the fibers 1 and into a space defined by an outer, planar surface of the other tubesheet 3 and the inner surface of the other end cap 6. As a result of the oxygen transport properties of the fibers 1, the air introduced into the space defined by the outer, planar surface of the tubesheet 3 and the inner surface of the other end cap 6 via the port formed in the housing becomes oxygen-deficient and nitrogen-enriched. This nitrogen-enriched air flows out of an outlet port formed in the housing.

In yet another embodiment, a gas separation module including a proton transport membrane may be used to separate hydrogen from a hydrogen-containing gas mixture. As one example of a hydrogen-containing gas mixture, syngas may be introduced to one side of the membrane and hydrogen may be withdrawn from the other side of the membrane. The high temperature necessary for proton transport may be obtained by feeding hot syngas to the membrane directly from the syngas reactor. Because the proton transport membrane is heated through feeding the hot syngas directly from the syngas production process, one may eliminate the need to cool the syngas for effecting separation of the hydrogen and CO (or hydrogen and $CO_2$ after a water shift reaction) that is otherwise required by conventional processes. In the above embodiment, hydrogen from the first gas (preferably syngas) is transported from the interior of the fiber 1 to a space defined by outer surfaces of the fibers 1 and the inner surface of the housing in between each of the tubesheets 3. The thus-produced hydrogen then flows out of an outlet port formed in the housing. The hydrogen-deficient and carbon monoxide-enriched portion of the first gas (i.e., the residue or retentate gas) flows out of the opposite end of the fibers 1 and into a space defined by an outer, planar surface of the other tubesheet 3 and the inner surface of the other end cap 6. This residue gas then flows out of the port formed in the other end cap 6.

EXAMPLES

Comparative Example 1

Not Part of this Invention

A solution of 9.0 wt % polyethersulfone (PES) in N-methyl-2-pyrrolidone (NMP) was prepared in a high shear mixer (300 to 400 rpm) in the temperature range of 70 to 80° C. Un-milled perovskite was added to the solution in the mixer to obtain 65.0 wt % perovskite, 6.4 wt % PES in NMP while maintaining the ceramic paste temperature in the range of 70 to 100° C. The un-milled perovskite exhibited a broad particle size distribution containing some large agglomerates greater than 5 microns as shown in FIG. 1 (measured with a Beckman Coulter LS13320). The composition of the particular perovskite employed is also shown in FIG. 1. The PES/perovskite suspension was pumped into an annulus design spinneret at a rate of 120 cc/hr. The spinneret had fiber channel dimensions of 830 µm OD and 406 µm ID. The temperature of the spinneret was maintained at a temperature of 70 to 80° C. A bore fluid of pure water was injected into the center capillary pin at a rate of 60 cc/hr. The fiber traversed through an air-gap ~5 cm into a pure $H_2O$ quench bath maintained at about 20° C. The resulting nascent fiber was brittle and could not traverse the under-water fiber guides. The fiber could not be drawn in the air gap without producing irregular-diameter fiber or breaking. The un-drawn wet fiber was washed with water at room temperature overnight to remove the solvent NMP, and then was air dried. The dried fiber was extremely brittle and required extreme care to handle in short lengths. The OD and ID of the dried fiber was essentially the same as the spinneret dimensions, which implies that there was no draw-down in the air-gap.

Figure 2A:
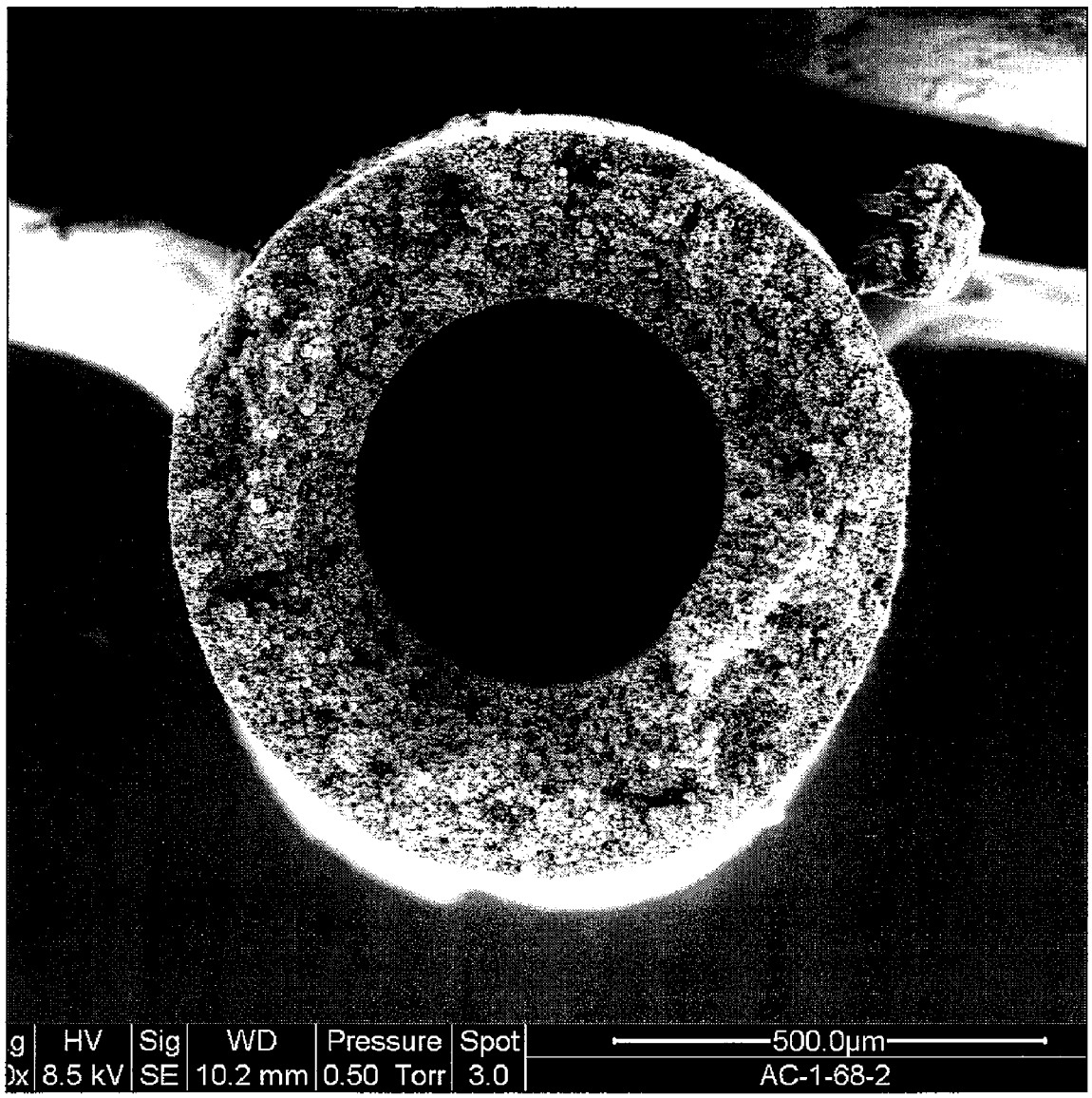
FIG. 2A shows an SEM photomicrograph of precursor polymeric/inorganic fiber produced in Comparative Example 1.
Figure 2B:
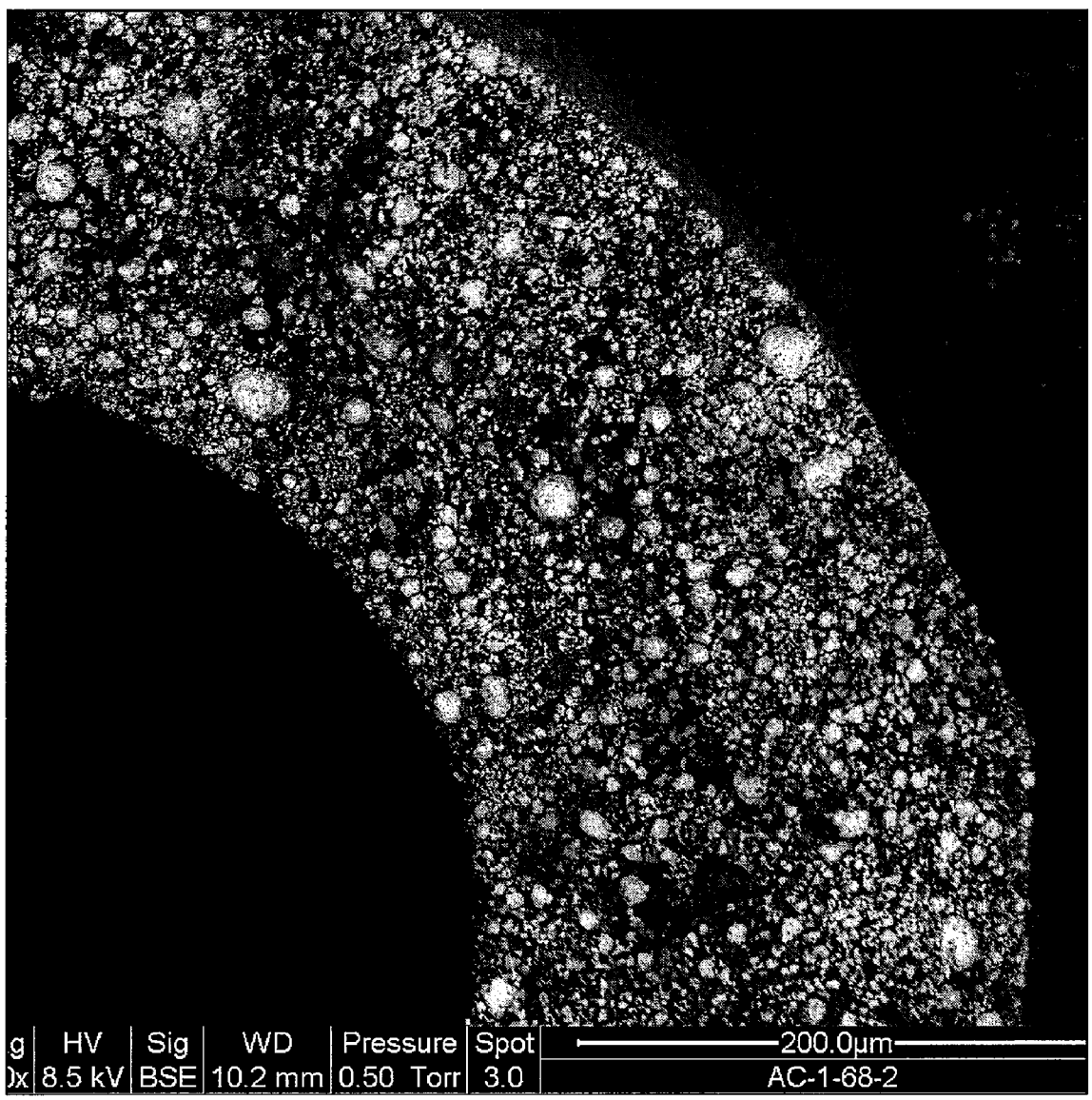
FIG. 2B shows an SEM photomicrograph of precursor polymeric/inorganic fiber produced in Comparative Example 1.

The SEM cross section of the fibers is shown in FIG. 2.

Comparative Example 2

Not Part of this Invention

Figure 3:
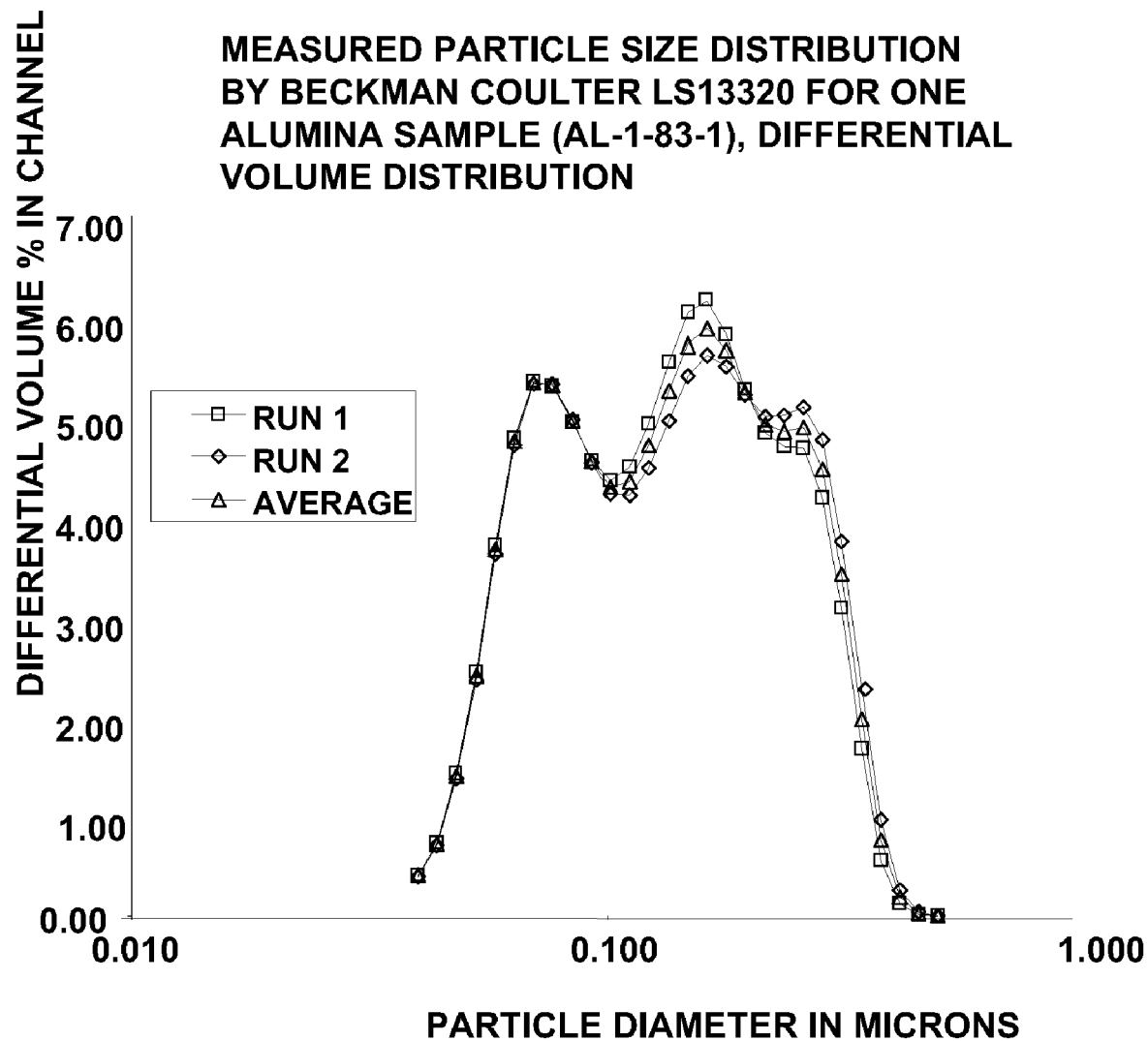
FIG. 3 depicts the particle size distribution of a specific alumina material after attrition milling.
Figure 4:
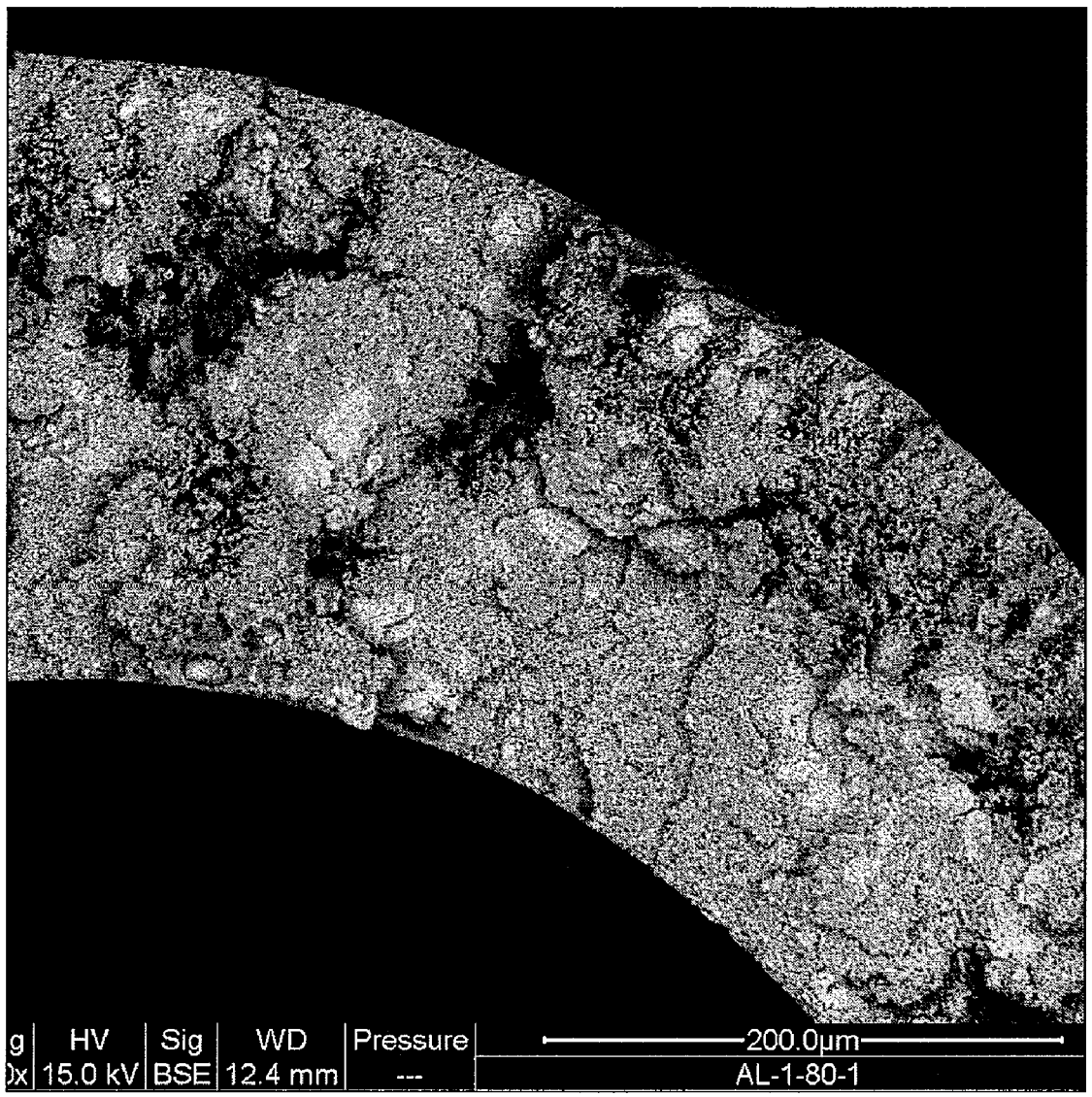
FIG. 4 is a SEM photomicrograph of the fiber wall of precursor polymeric/inorganic fiber produced in Comparative Example 2.

A solution containing 70 wt % attrition-milled perovskite and 7.3 wt % PES was prepared in a high shear mixer as described in Comparative Example 1. As depicted in FIG. 3, the attrition-milled perovskite essentially exhibited a significantly narrower submicron particle size distribution than the un-milled perovskite counterpart shown in FIG. 1. The ceramic suspension was pumped at a rate of 100 cc/hr into a spinneret having fiber channel dimensions of OD/ID=1524/711 µm which was maintained at 80° C. A bore fluid containing 25 volume % NMP in water was injected into the bore of the fiber at a rate of 75 cc/hr. The nascent fiber in gravity-fall spinning traveled through an air-gap length of 1 cm into a water bath at 24° C. The fiber was brittle and could not be collected on the take-up roll. The fibers were washed and dried as described in Example 1. The dried fiber was extremely brittle. The mechanical properties of the green fiber were measured in extension at room temperature. The fiber exhibited an elongation at break of about 2%, which indicates that the ceramic fibers spun with the PES binder had poor ductility. The SEM cross section of the thin walled fiber (~200 microns) is shown in FIG. 4.

Example 1

Figure 5A:
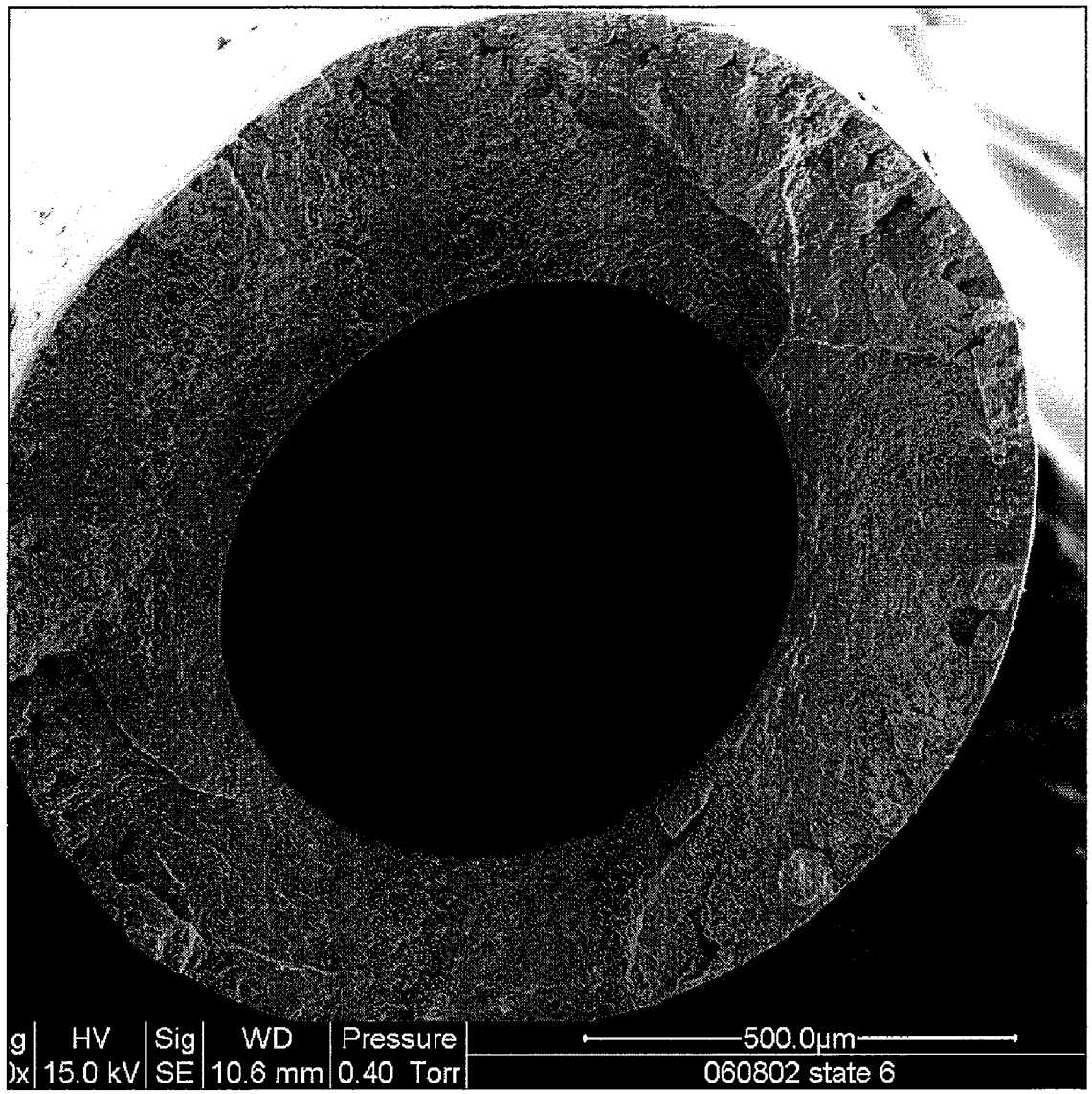
FIG. 5A is a SEM photomicrograph of the precursor polymeric/inorganic fiber produced in Example 1.
Figure 5B:
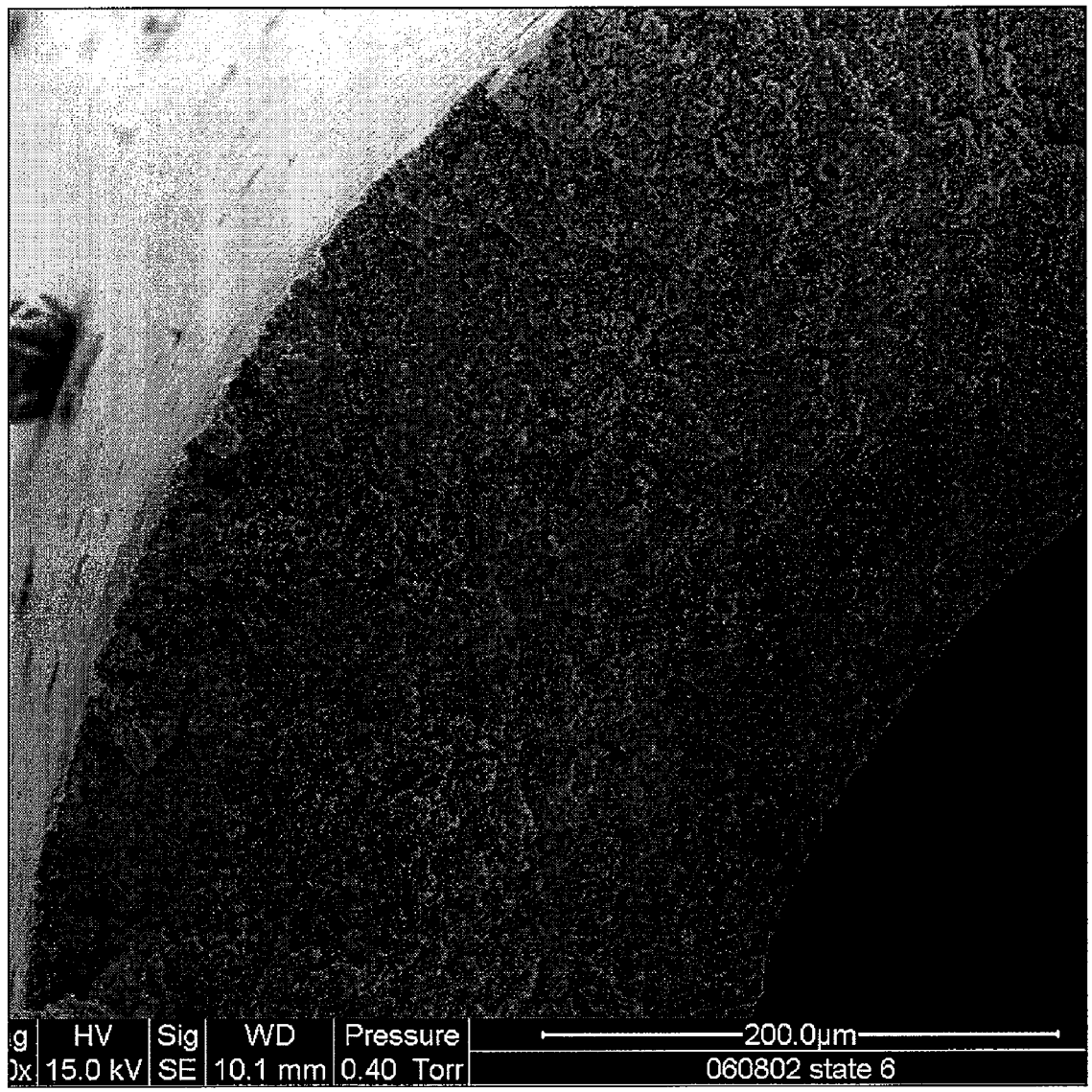
FIG. 5B is another SEM photomicrograph of the precursor polymeric/inorganic fiber produced in Example 1.
Figure 5C:
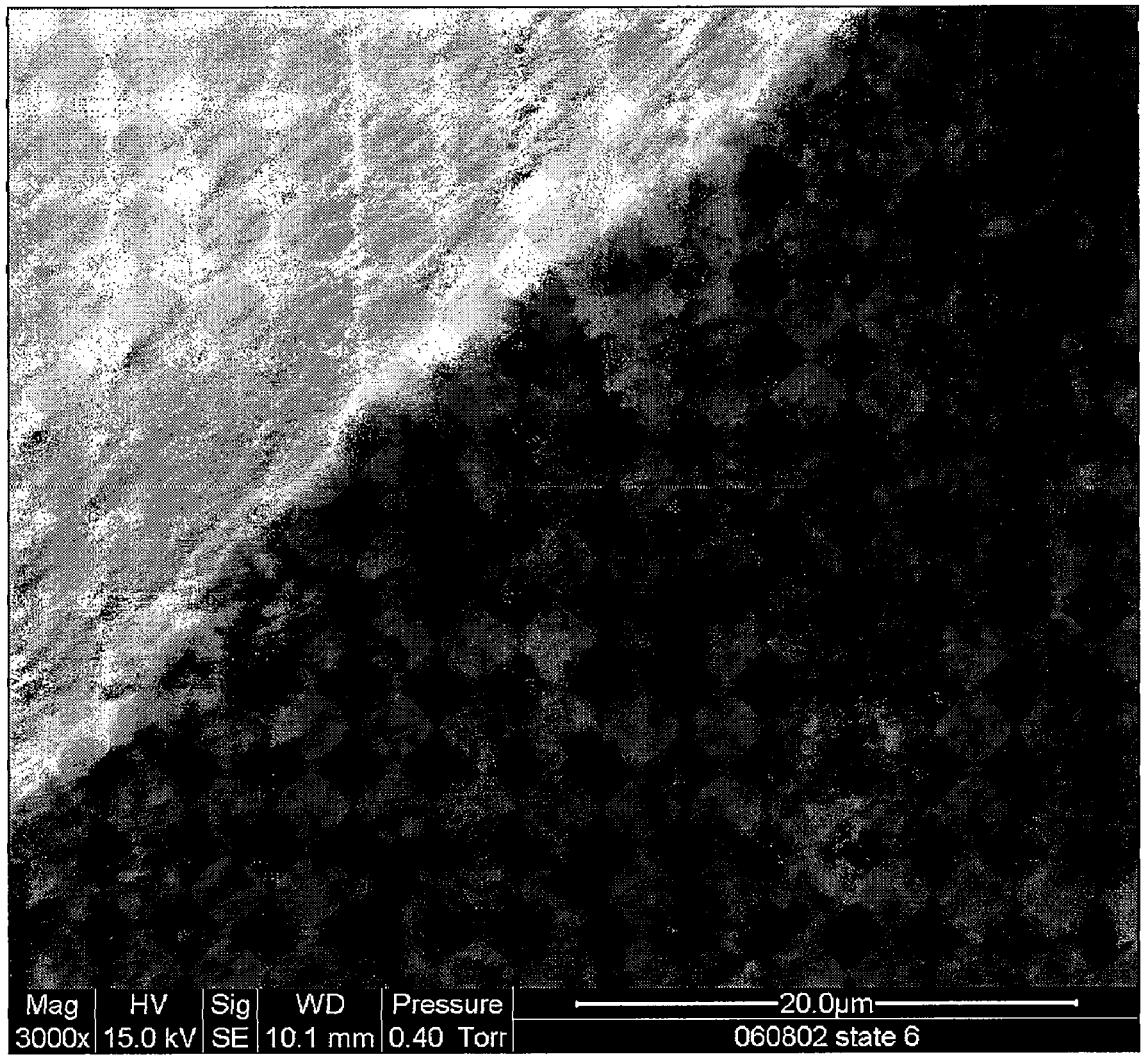
FIG. 5C is another SEM photomicrograph of the precursor polymeric/inorganic fiber produced in Example 1.

A solution containing 70 wt % attrition milled perovskite (with a dispersing agent of Phospholane PE 169) and 7.3 wt % Lycra L-162 containing ~90 wt % polyurethane soft segments in DMAC was prepared in the high shear mixer as described in Example 1. The polymeric/inorganic suspension was metered into a spinneret having fiber channel dimensions OD/ID=1524/711 microns at rate of 150 cc/hr at 70° C. A bore fluid containing 25 volume % NMP in water was metered into the bore of the fiber at a rate of 75 cc/hr. The fiber traversed an air-gap length of 1 cm and was coagulated in a water bath maintained at 16° C. The fiber could traverse the under-water fiber guides and be collected on a take-up roll at a speed of about 5 meters/min. Unlike the glassy PES binder counterpart the use of rubbery block copolymer as the binder enabled demonstration of continuous spinnability. The fibers were washed and dried as described in Example 1. The dried fiber exhibited improved ductility as compared to the PES counterpart. The mechanical properties of the green fiber were measured in extension at room temperature. The fiber exhibited an elongation at break of about 6% which indicates that the ceramic fibers spun with the Lycra binder had enhanced ductility. The SEM cross sections of the fibers are shown in FIGS. 5A, 5B, 5C.

Example 2

A solution containing 60 wt % attrition milled perovskite and 7.3 wt % Elastollan 1180A10 in NMP was prepared in the high shear mixer as described in Example 1. Elastollan 1180A10 is a polyether-based thermoplastic polyurethane block copolymer available from BASF corporation. The soft segments are thought to be based on the reaction of hydroxyl terminated 1,4-polybutylene glycol with 4,4'-methylenebis (phenylisocyanate) and the hard segments are thought to be based on the reaction of butanediol with 4,4'-methylenebis (phenylisocyanate). It is a rubbery block copolymer containing about 15 wt % hard segments.

Figure 6A:
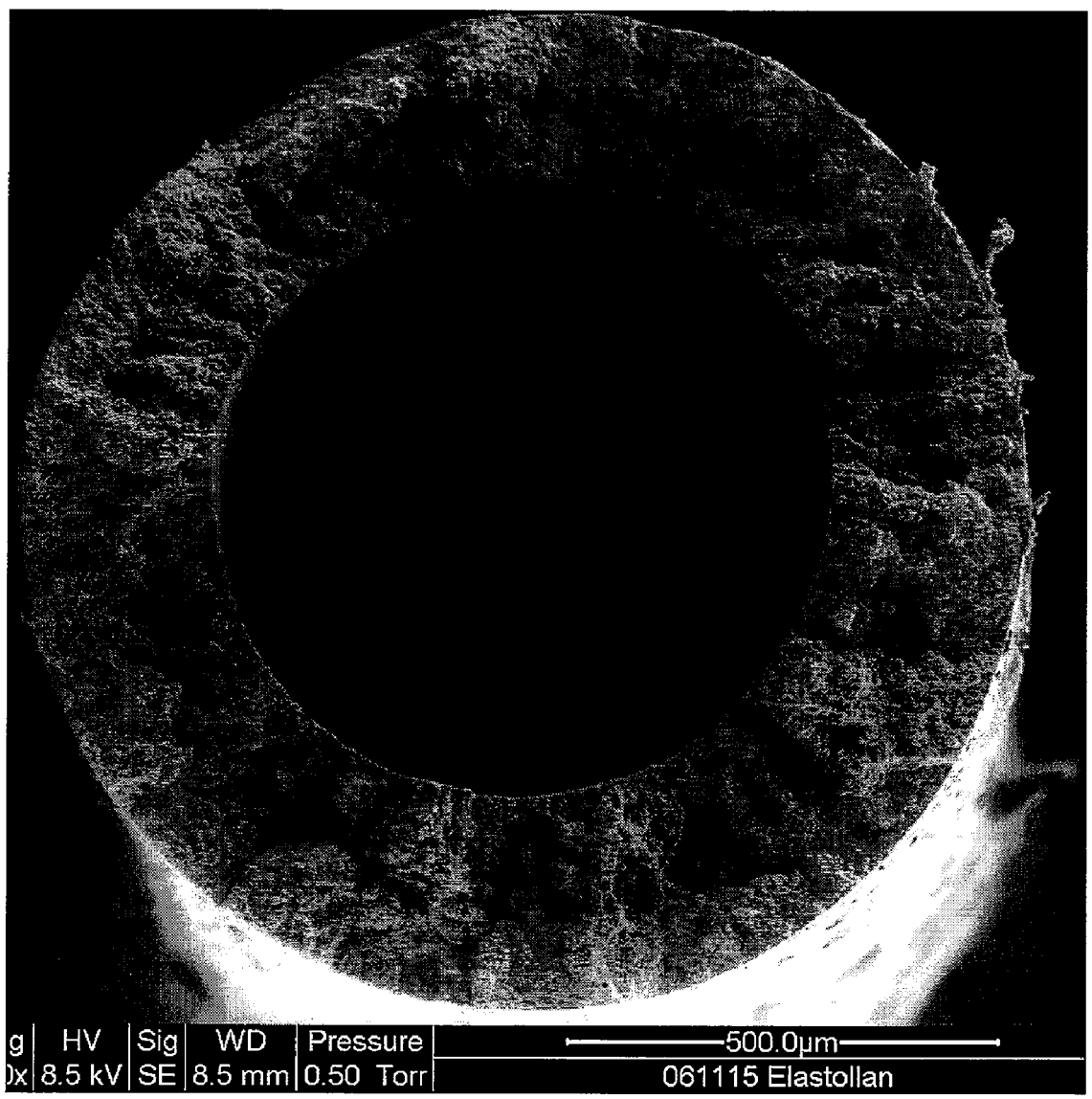
FIG. 6A is a SEM photomicrograph of the precursor polymeric/inorganic fiber produced in Example 2.
Figure 6B:
FIG. 6B is another SEM photomicrograph of the precursor polymeric/inorganic fiber produced in Example 2.
Figure 6C:
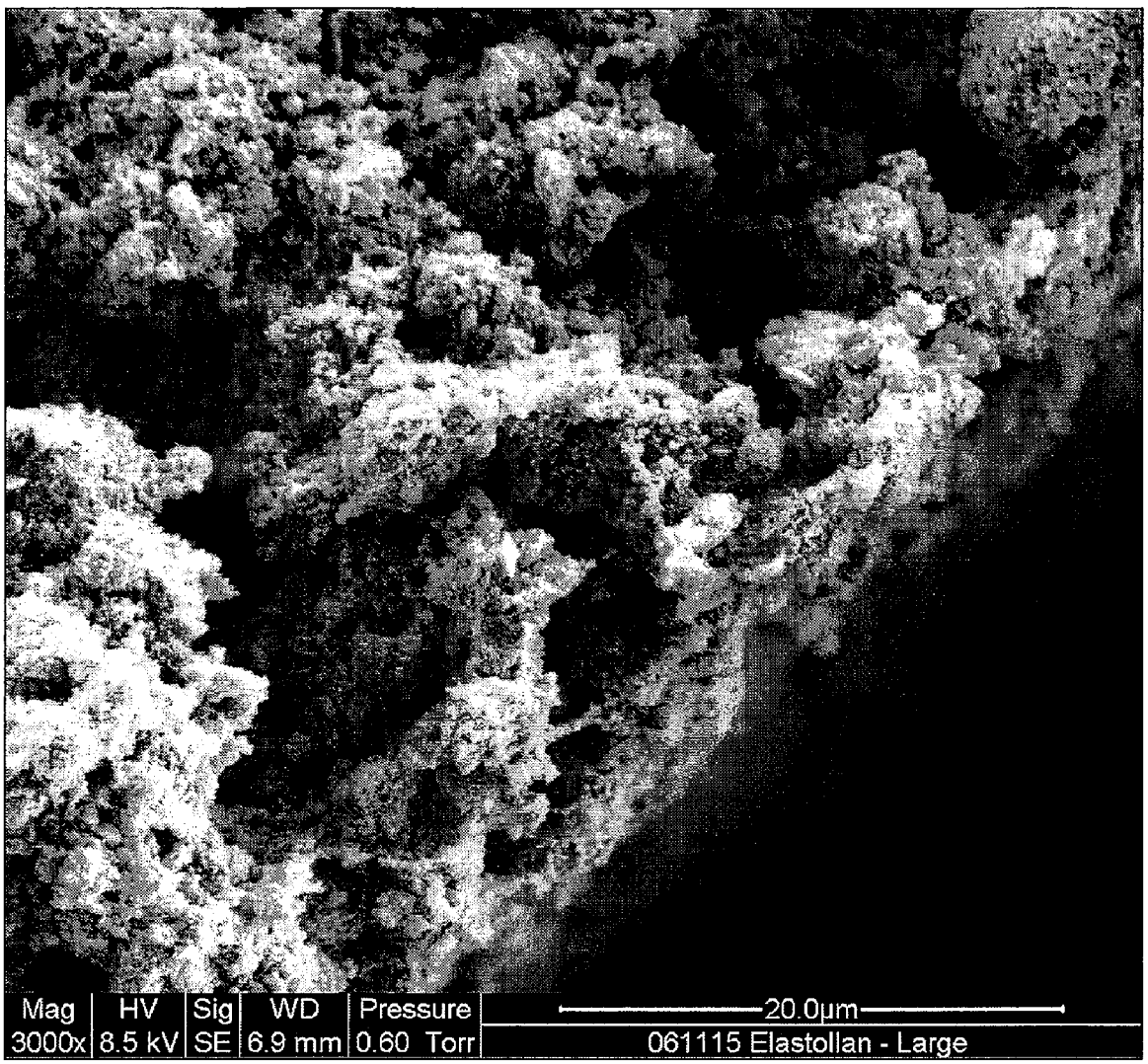
FIG. 6C is another SEM photomicrograph of the precursor polymeric/inorganic fiber produced in Example 2.

The ceramic suspension was metered into a spinneret having fiber channel dimensions OD/ID=1524/711 microns at rate of 135 cc/hr at 40° C. A bore fluid of pure water was metered into the bore of the fiber at a rate of 83 cc/hr. The fiber traversed an air-gap length of 1 cm and was coagulated in a water bath maintained at 20° C. The fiber could traverse the under-water fiber guides and be collected on a take-up roll at a speed of about 12 meters/min. The mechanical properties of the precursor polymeric/inorganic fiber were measured in extension at room temperature. The fiber exhibited an elongation at break of about 6%, which indicates that the ceramic fibers spun with the rubbery block copolymer binder exhibit enhanced ductility. The SEM cross sections of the fibers are shown in FIGS. 6A, 6B, 6C. For both of the rubbery block copolymers the SEMs appear to indicate a denser outer skin layer and a density gradient across the wall of the fiber to the inner bore which also appears to be denser due to the internal coagulation.

Figure 7A:
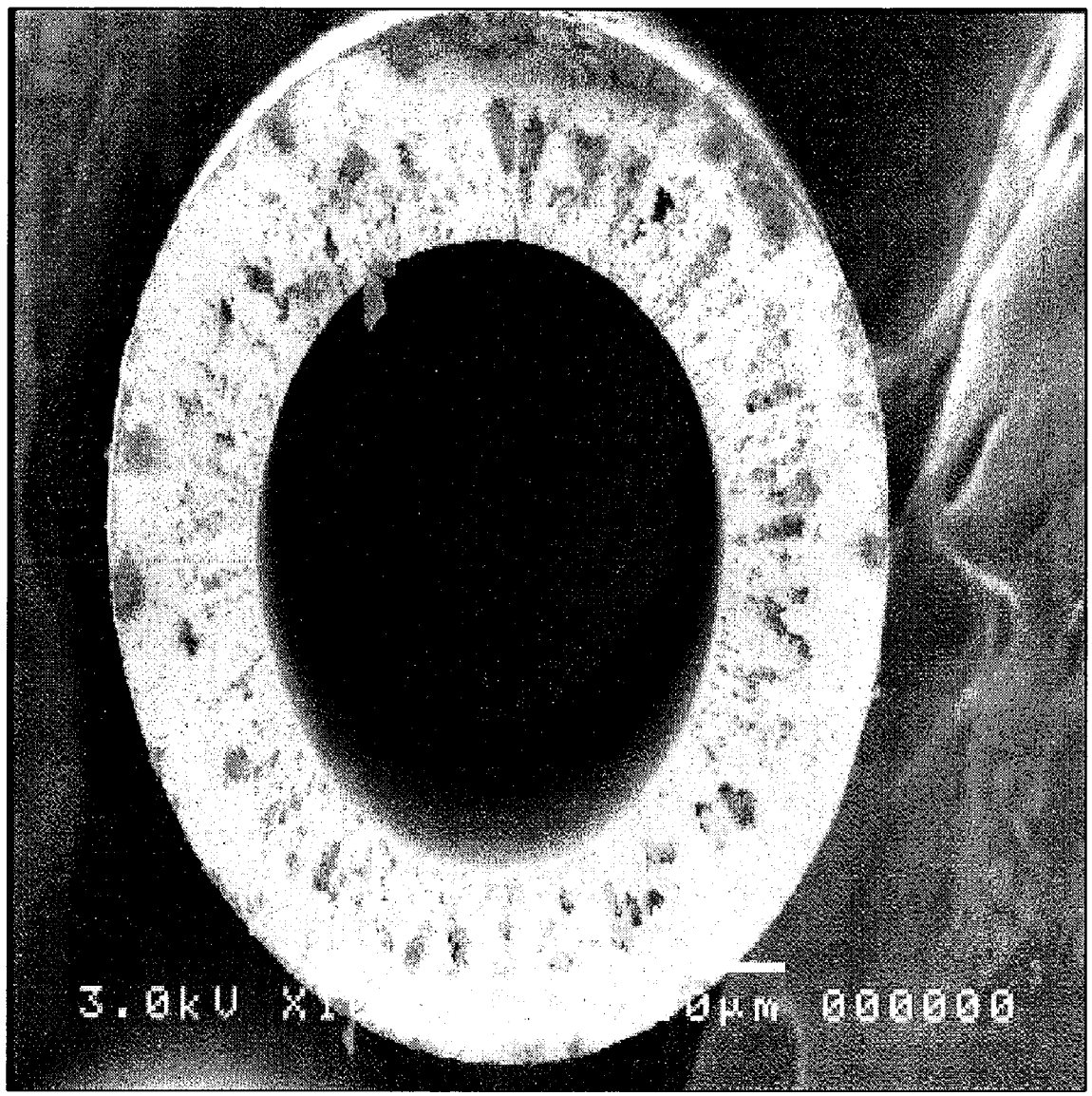
FIG. 7A, 7B is a SEM photomicrograph of the sintered fibers produced in Example 2.
Figure 7B:
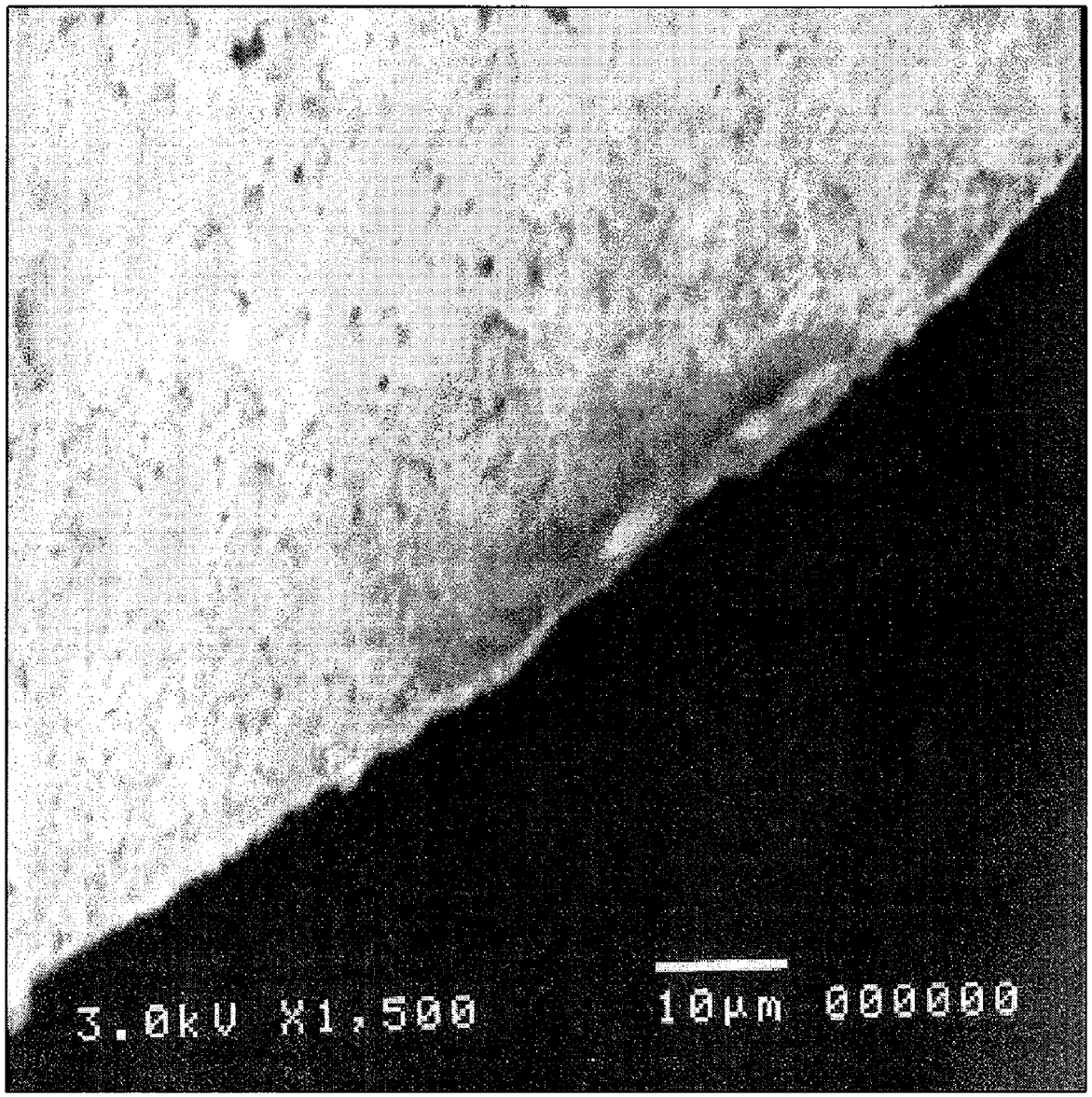

The SEM cross sections of the fibers from Example 2 sintered at 1350° C. for 2 hours also indicate the presence of asymmetry with a denser skin layer as shown in FIGS. 7A, 7B.

Example 3

A solution containing 60 wt % attrition milled perovskite and 7.3 wt % Estane 5708 in NMP was prepared in the high shear mixer as described in Example 1. Estane 5708 is a polyester-based thermoplastic polyurethane block copolymer available from the Lubrizol Corporation. The soft segments are thought to be a polyester derived from polycondensation of adipic acid and butanediol. The hard segments are thought to be based on the reaction of butanediol with 4,4'-methylenebis(phenylisocyanate). It is a rubbery block copolymer containing about 85 to 90 wt % soft segments with a glass transition temperature $T_g$ of –33° C.

The ceramic suspension was metered into a spinneret having fiber channel dimensions OD/ID=1524/711 microns at rate of 150 cc/hr at 32° C. A bore fluid containing 75% volume water and 25% volume NMP was metered into the bore of the fiber at a rate of 75 cc/hr. The fiber traversed an air-gap length of 1 cm and was coagulated in a water bath maintained at 6° C. The fiber could traverse the under-water fiber guides and be collected on a take-up roll at a speed of about 9 meters/min. The mechanical properties of the precursor polymeric/inorganic wet fiber after washing off the solvent NMP was measured in extension at room temperature. The fiber exhibited an elongation at break of about 20 to 30%. The mechanical properties of the precursor polymeric/inorganic dry fiber were also measured. The fiber exhibited an elongation at break about 4 to 6% which indicates that the ceramic fibers spun with the rubbery block copolymer binder exhibit enhanced ductility and continuous spinnability. The tensile data also indicated that the wet fibers exhibit significantly enhanced ductility as compared to their dry counterparts. The wet ceramic precursor fibers can be more readily processed in module fabrication steps.

Example 4

Figure 8A:
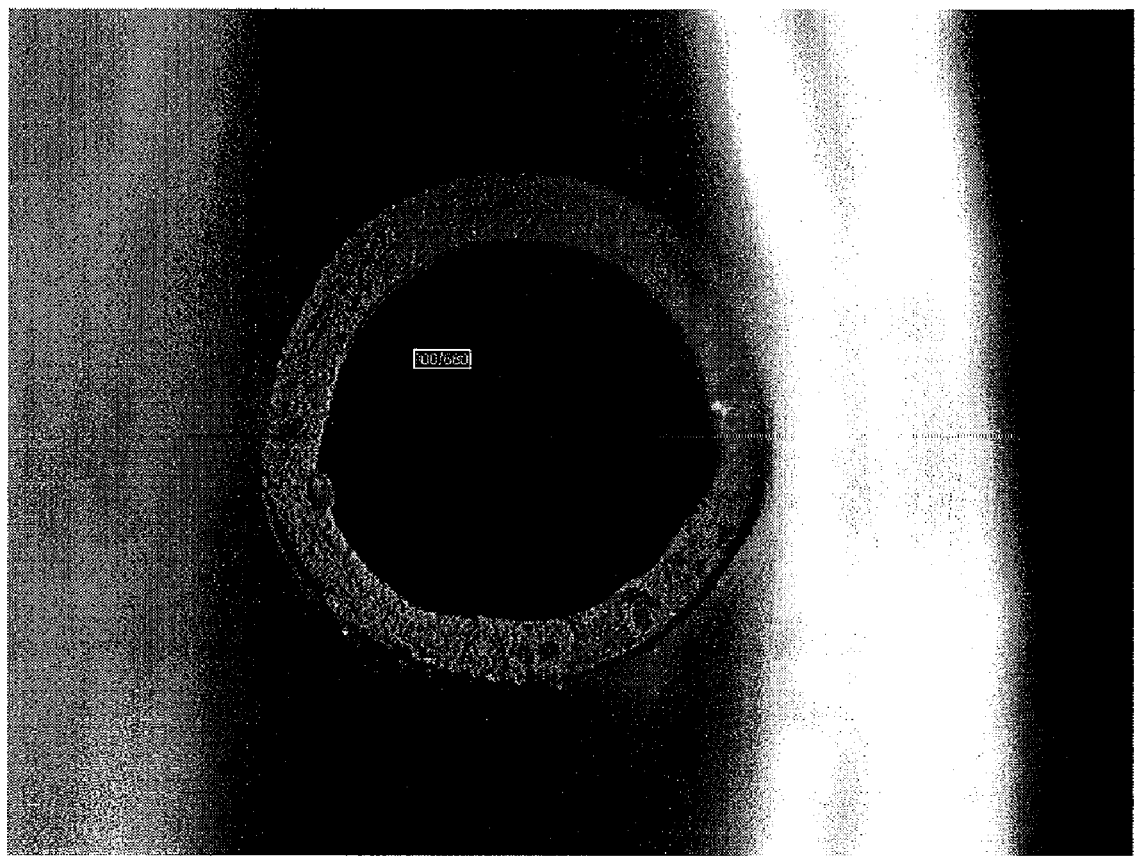
FIG. 8A is a SEM photomicrograph of the precursor polymeric/inorganic fiber produced in Example 4.
Figure 8B:
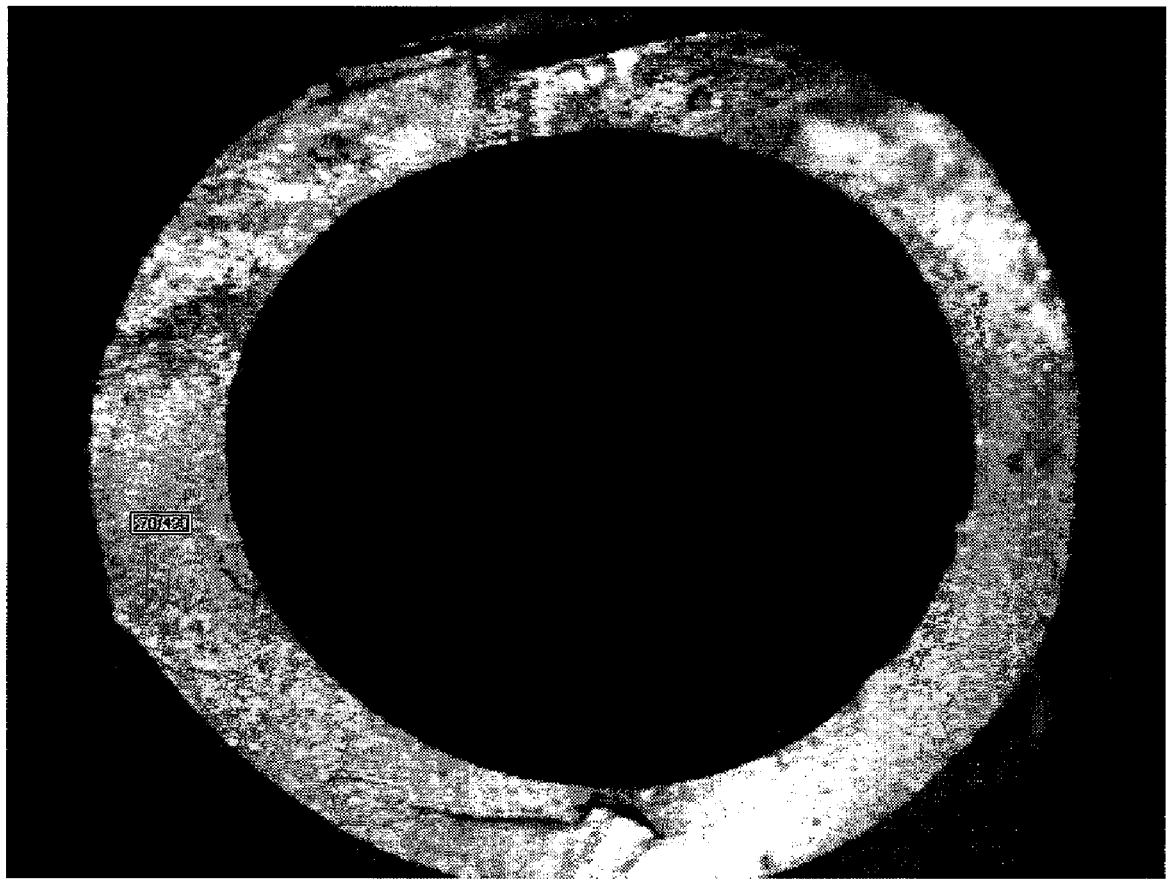
FIG. 8B is a SEM photomicrograph of the sintered fiber produced in Example 4.

A solution containing 65 wt % attrition milled perovskite and 7.3 wt % Estane 5708 containing as described in Example 3 was prepared in the high shear mixer which was disclosed in Example 1. The ceramic suspension was metered into a spinneret having fiber channel dimensions OD/ID=1524/711 microns at a rate of 150 cc/hr at 22° C. A bore fluid of pure $H_2O$ was metered into the bore of the fiber at a rate of 100 cc/hr. The fiber traversed an air-gap length of 1 cm and was coagulated in a $H_2O$ bath maintained at 9° C. The fiber exhibited good ductility and hence could traverse the under-$H_2O$ fiber guides and be collected on a take-up roll at speeds of about 4 and 6 meters/min. The ceramic precursor fibers exhibits and OD/ID of 1100/750 and 950/725 microns. The fibers were washed and dried as described in Example 1. The optical microscope picture of the cross section of the precursor perovskite fiber collected at 6 M/min is shown in FIG. 8A. The optical microscope picture of the cross section of the same perovskite fiber sintered at 1350° C. is shown in FIG. 8B. Upon sintering the fiber dimensions for the precursor fiber were significantly reduced to OD/ID of 670/490 microns. The sintered fiber wall exhibited a macrovoid free dense perovskite morphology.

Example 5

Figure 9:
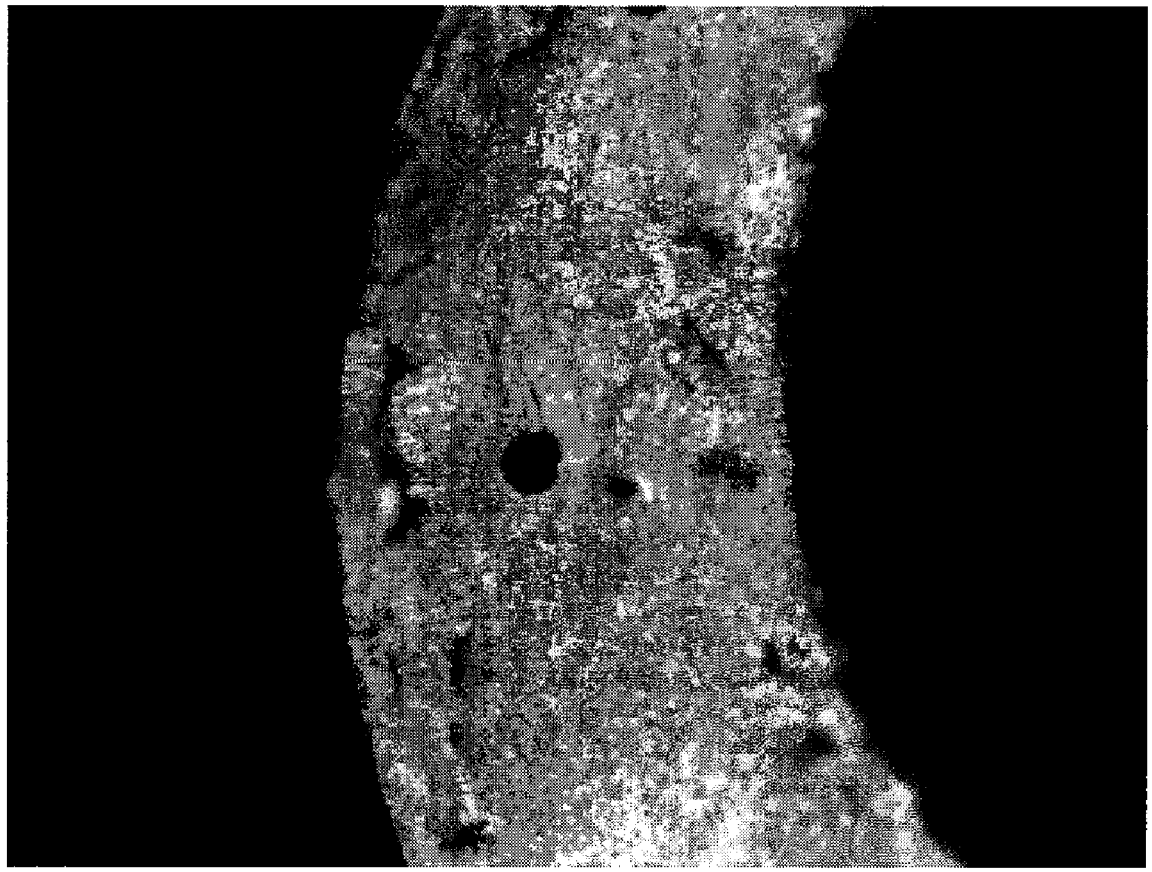
FIG. 9 is a SEM photomicrograph of the sintered fiber produced in Example 5.

A solution containing 70 wt % attrition milled perovskite and 7.3 wt % Estane 5708 was prepared as described in Example 3. The ceramic suspension was metered into a spinneret having fiber channel dimensions OD/ID=1524/711 microns at a rate of 150 cc/hr at 70° C. A bore fluid of pure $H_2O$ was metered into the bore of the fiber at a rate of 75 cc/hr. The fiber traversed an air-gap length of 1 cm and was coagulated in a $H_2O$ bath maintained at 9° C. The fiber was brittle and could not be traversed around the under-water guides. Consequently only gravity fall fibers could be collected. The as spun fibers were not flexible even in the wet state and fell apart upon contact. This example indicates that different block copolymers interact differently with the perovskite powder and exhibit different levels of ductility in the organic/inorganic precursor. Fibers containing 70% perovskite can be continuously spun with Lycra binder as described in Example 3 whereas with binder Estane 5708 the fibers containing 70% perovskite are brittle. FIG. 9 displays optical microscope cross section of the sintered fiber at 1350° C. Fiber wall appears to indicate a non-uniform morphology.

We claim:

1. A composite hollow fiber comprised of inorganic particles bound together with a copolymer comprising soft segments and hard segments.

2. The hollow fiber of claim 1, wherein a weight ratio of inorganic particles to copolymer is in a range of from about 5.0:1.0 to about 12.0:1.

3. The hollow fiber of claim 1, wherein an outside diameter of the fiber is in a range from about 100 to 2000 μm and a ratio of the outside-diameter to the inside-diameter is in a range of from about 1.20:1.0 to about 3.0:1.0.

4. The hollow fiber of claim 1, wherein the copolymer is a block copolymer selected from the group consisting of poly(ether)urethane-block-polyurethane, poly(ether)urethane-block-polyurea, poly(ester)urethane-block-polyurethane, and poly(ester)urethane-block-polyurea.

5. The hollow fiber of claim 4, wherein the block copolymer essentially consists of a first block comprising repeating units represented by formula Ia and a second block comprising repeating units represented by formula Ib:

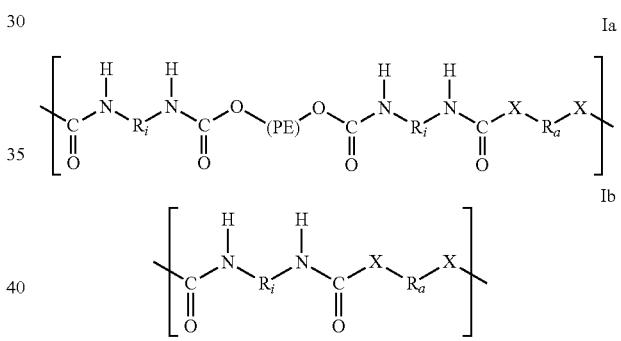

wherein
each $R_i$ is independently an aliphatic or aromatic radical;
each PE is independently a polyether or polyester;
each $R_a$ is independently a linear or branched aliphatic radical; and
X is O or NH.

6. The hollow fiber of claim 5, wherein each PE is independently a polyether derived from a polyether glycol selected from the group consisting of hydroxyl terminated polyethylene glycol, hydroxyl terminated 1,2-polypropylene glycol, hydroxyl terminated 1,3-polypropylene glycol, and hydroxyl terminated 1,4-polybutylene glycol.

7. The hollow fiber of claim 5, wherein each PE is independently a polyester derived from the reaction of a linear or branched aliphatic diol comprising 2-18 carbon atoms and a linear or branched aliphatic diacid comprising 2-18 carbon atoms.

8. The hollow fiber of claim 5, wherein each $R_a$ is independently derived from at least one linear or branched aliphatic diol selected from the group consisting of ethylene glycol, 1,3-propanediol, 1,2-propanediol, 1,4-butanediol, and 1,6-hexanediol.

9. The hollow fiber of claim 5, wherein each $R_a$ is independently derived from a linear or branched aliphatic diamine selected from the group consisting of 1,2-diaminoethane, 1,4-diaminobutane, 1,5-diaminopentane, 1,5-diaminohexane, and 1,6-diaminohexane.

10. The hollow fiber of claim 5, wherein $R_d$ is derived from a mixture of at least one aliphatic diol and at least one aliphatic diamine.

11. The hollow fiber of claim 5, wherein the soft segments comprise about 50-95 weight % of the copolymer.

12. The hollow fiber of claim 1, wherein the inorganic particles are made of a material selected from the group consisting of an elemental metal, a glass material, a metallic oxide, a zeolite, a perovskite, and mixtures thereof.

13. The hollow fiber of claim 1, wherein the inorganic particles are made of a perovskite.

14. The hollow fiber of claim 13, wherein the inorganic particles are comprised of a perovskite of the formula $(Ln_{1-x}A_x)_w(B_{1-y}B'_y)O_{3-d}$, wherein:
Ln represents one or more elements selected from the group consisting of La, the D block lanthanides, and Y;
A represents one or more elements selected from the group consisting of Mg, Ca, Sr, and Ba;
B and B' each represent one or more elements selected from the group consisting of Sc, Ti, V, Cr, Mn, Fe, Co, Ni, Zr, and Ga;
$0 \leq x \leq 1$, $0 \leq y \leq 1$, and $0.95 \leq w \leq 1.05$; and
d is a number that renders the perovskite charge neutral.

15. The hollow fiber of claim 14, wherein the inorganic particles are comprised of a perovskite of the formula $La_{0.8}Sr_{0.2}Fe_{0.7}Ga_{0.3}O_{3-d}$ and d is a number that renders the perovskite charge neutral.

16. The hollow fiber of claim 14, wherein the inorganic particles are comprised of a strontium doped lanthanum iron cobalt oxide perovskite of the composition $La_{(1-x)}Sr_xCo_{(1-y)}Fe_yO_{3-d}$, wherein $0<x<1$ and $0<y<1$ and d is a number such that the perovskite is electrically neutral.

17. The hollow fiber of claim 16, wherein the inorganic particles are comprised of a perovskite of the formula $La_{0.8}Sr_{0.2}Fe_{0.7}Co_{0.3}O_{3-d}$, wherein d is a number such that the perovskite is electrically neutral.

18. The hollow fiber of claim 13, wherein the inorganic particles are comprised of a perovskite of the formula $Ba_{0.5}Sr_{0.5}Fe_{0.2}Co_{0.8}O_{3-\delta}$ and $\delta$ is a number such that the perovskite is electrically neutral.

19. The hollow fiber of claim 13, wherein the inorganic particles are comprised of a perovskite of the formula $BaCe_{1-x}M_xO_{3-d}$, where M is a metal dopant, x is greater than 0 but less than 1, and d is a number such that the perovskite is electrically neutral.

20. The hollow fiber of claim 13, wherein:
the inorganic particles are comprised of a perovskite of the formula $ACe_{0.95}M_{0.05}O_{3-d}$;
A is Ba or Sr;
M is Y or Yb; and
d is such that the perovskite is electrically neutral.

21. The hollow fiber of claim 13, wherein the inorganic particles are comprised of a perovskite of the formula $Sr(Co_{0.8}Fe_{0.2})_{1-x}Ti_xO_{3-d}$ and d is a number such that the perovskite is electrically neutral.

22. The hollow fiber of claim 13, wherein the inorganic particles are comprised of a perovskite of the formula $Ca_xTi_yFe_zO_{3-d}$, x, y, and z are non-zero numbers less than 1, and d is a number such that the perovskite is electrically neutral.

23. The hollow fiber of claim 13, wherein:
the inorganic particles are comprised of a perovskite of the formula $La_x(Ca_nMn_m)_yO_{3-d}$;
x and y are non-zero numbers;
y is $>x$; and
d is a number such that the perovskite is electrically neutral.

24. The hollow fiber of claim 1, wherein 50% by volume of the inorganic particles have a diameter less than 0.7 μm.

25. The hollow fiber of claim 1, wherein the hollow fiber has an elongation at break of 2.0-5.0%.

26. A sintered hollow fiber produced by sintering the hollow fiber of claim 13.

27. The sintered hollow fiber of claim 26, wherein an outside diameter of the sintered fiber is in a range from about 250 to 1500 μm and a ratio of the outside-diameter to the inside-diameter is in a range of from about 1.20:1.0 to about 3.0:1.0.

28. The sintered hollow fiber of claim 26, wherein said fiber is gas-tight.

29. A process for making the composite hollow fiber of claim 1, comprising the steps of:
a) preparing a suspension of the inorganic material in particulate form, the copolymer binder, a solvent for said copolymer binder, and optionally one or more additives;
b) providing a spinneret adapted and configured to continuously extrude one or more nascent hollow fibers, the spinneret having an inner annular channel disposed concentrically within an outer annular channel;
c) feeding a bore fluid through the inner annular channel to form a cylindrical fluid stream positioned concentrically within the fiber;
d) feeding the suspension through the outer annular channel so that it surrounds the cylindrical fluid stream to form a nascent hollow fiber;
e) passing the nascent hollow fiber from the spinneret through an air gap;
f) immersing the nascent hollow fiber in a liquid coagulant to facilitate phase inversion;
g) removing the fiber from the coagulant;
h) winding the fiber onto a take-up roll;
i) washing the fiber to remove residual solvent and optional additives; and
(j) drying the fiber to remove volatile material.

30. The process of claim 29, wherein the suspension has a concentration of particulate inorganic material in a range of from about 50 wt. % to about 75 wt. % and a concentration of the copolymer binder in a range of from about 5 wt. % to about 15 wt. %.

31. A gas separation membrane module, comprising:
first and second opposed tubesheets;
at least one of the sintered hollow fibers of claim 26, said at least one sintered hollow fiber having a first end extending through a hole extending through said first tube sheets and a second end extending through a hole formed in said second tubesheet;
a housing enclosing said tubesheets and at least one fiber, said housing having an outlet port and optionally an inlet port;
a first end cap engaging with said housing to define a space defined by an outer planar surface of said first tubesheet, an inner surface of said housing, and an inner surface of said first end cap, said first end cap having a inlet port; and
a second end cap engaging with said housing to define a space defined by an outer planar surface of said second tubesheet, an inner surface of said housing, and an inner surface of said second end cap, said second end cap having an outlet port.

32. A gas production method, comprising the steps of:
providing the gas separation membrane module of claim 31;
introducing a first gas to one side of said at least one fiber;
withdrawing a second gas from an opposite side of said at least one fiber, wherein the second gas comprises hydrogen or oxygen.

33. The gas production method of claim 32, further comprising the step of methane and steam are introduced to an interior of said at least one fiber via said first end cap inlet port, wherein:
the first gas is air;
the second gas comprises syngas comprising hydrogen and carbon monoxide;
the first gas is introduced to an exterior of said at least one fiber via said housing inlet port; and
the second gas is withdrawn from the module via said second end cap outlet port.

34. The gas production method of claim 32, wherein:
the first gas comprises syngas comprising hydrogen and carbon monoxide;
the second gas essentially consists of hydrogen;
the first gas is introduced to an exterior of said at least one fiber via said housing inlet port;
the second gas is withdrawn from said module via said second end cap outlet port; and
CO-enriched syngas is withdrawn from said housing outlet port.

35. The gas production method of claim 32, wherein:
the first gas is air;
the second gas comprises oxygen;
the first gas is introduced to an exterior of said at least one fiber via said housing inlet port;
the second gas is withdrawn from said module via said second end cap outlet port; and
nitrogen-enriched air is withdrawn from said housing outlet port.

36. The gas production method of claim 35, wherein the second gas essentially consists of oxygen.

37. The gas production method of claim 35, further comprising the step of introducing a sweep gas to said opposite side of said at least one fiber via said housing inlet port, wherein:
the first gas comprises air and is introduced to an exterior of said at least one fiber via said housing inlet port;
the second gas comprises oxygen-enriched sweep gas and is withdrawn from said module via said second end cap outlet port.

38. The gas production method of claim 37, wherein the sweep gas comprises $CO_2$.

39. The gas production method of claim 37, wherein the sweep gas comprises steam.

40. The gas production method of claim 37, wherein the sweep gas comprises $CO_2$ and steam derived from a flue gas.

* * * * *